(12) United States Patent
Fujimori et al.

(10) Patent No.: US 7,661,192 B2
(45) Date of Patent: Feb. 16, 2010

(54) MANUFACTURING METHOD FOR COOLING UNIT HAVING A PAIR OF TABULAR MEMBERS, COOLING UNIT, OPTICAL DEVICE, AND PROJECTOR

(75) Inventors: Motoyuki Fujimori, Suwa (JP); Satoshi Kinoshita, Matsumoto (JP); Makoto Zakoji, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 512 days.

(21) Appl. No.: 11/335,604

(22) Filed: Jan. 20, 2006

(65) Prior Publication Data

US 2006/0197919 A1    Sep. 7, 2006

(30) Foreign Application Priority Data

Mar. 1, 2005    (JP)    ............................. 2005-055629

(51) Int. Cl.
*B21D 53/06*    (2006.01)
(52) U.S. Cl. .............................. 29/890.046; 29/890.03; 29/890.038; 29/890.045; 165/185
(58) Field of Classification Search ............ 29/890.038, 29/890.046; 165/185
See application file for complete search history.

(56) References Cited

U.S. PATENT DOCUMENTS 4,080,703 A * 3/1978 Beck, Jr. ................ 29/890.038
5,014,776 A * 5/1991 Hess ........................... 165/185
5,749,144 A * 5/1998 Hirano et al. .......... 29/890.046
2006/0196050 A1   9/2006 Fujimori et al.
2006/0198150 A1   9/2006 Kinoshita et al.
2007/0051057 A1   3/2007 Zakoji et al.

FOREIGN PATENT DOCUMENTS

| JP | A-60-000294 | 1/1985 |
| JP | A-08-205466 | 8/1996 |
| JP | A-09-096787 | 4/1997 |
| JP | A 2002-156195 | 5/2002 |
| JP | A-2003-262917 | 9/2003 |
| JP | A-2003-337219 | 11/2003 |
| JP | A-2006-242415 | 9/2006 |
| JP | A-2006-243123 | 9/2006 |
| JP | A-2006-275501 | 10/2006 |

* cited by examiner

*Primary Examiner*—Rick K Chang
(74) *Attorney, Agent, or Firm*—Oliff & Berridge, PLC

(57) ABSTRACT

A method of manufacturing a cooling unit that includes a cooling plate in which a cooling fluid flows, the cooling plate having a structure in which a pair of tabular members are arranged to be opposed to each other with a cooling pipe, through which the cooling fluid flows, sandwiched between the tabular members, the manufacturing method includes: forming grooves for housing the cooling pipe in respective opposed surfaces of the pair of tabular members; forming projections projecting to inner sides of the grooves by applying an external force or joining a predetermined member to the respective opposed surfaces of the pair of tabular members; and combining each of the pair of tabular members and the cooling pipe by housing the cooling pipe in the grooves and expanding a diameter of the cooling pipe.

16 Claims, 25 Drawing Sheets

F I G. 1A
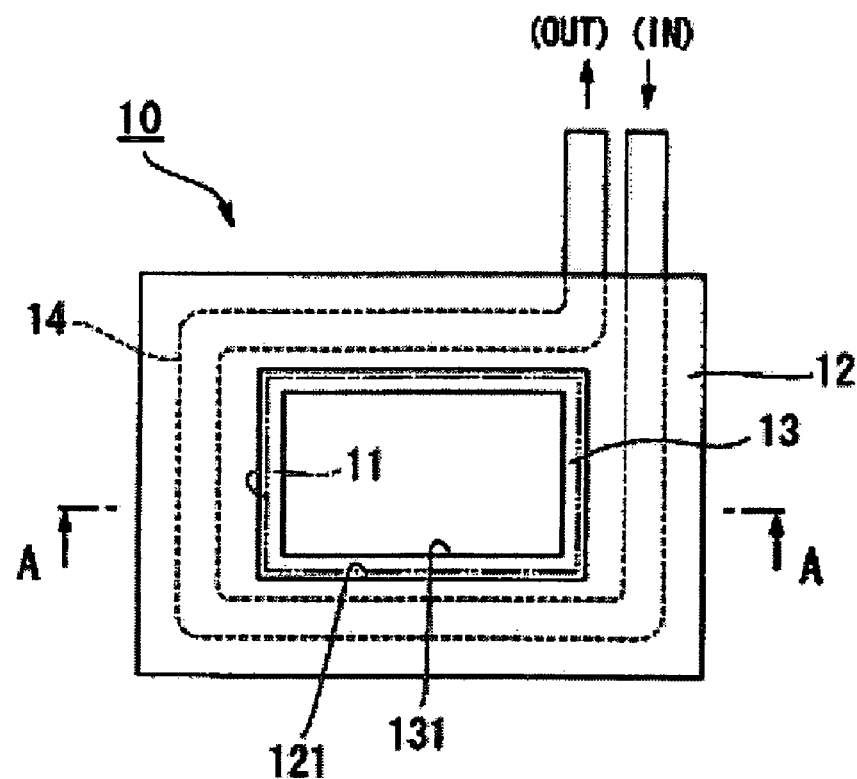
F I G. 1B
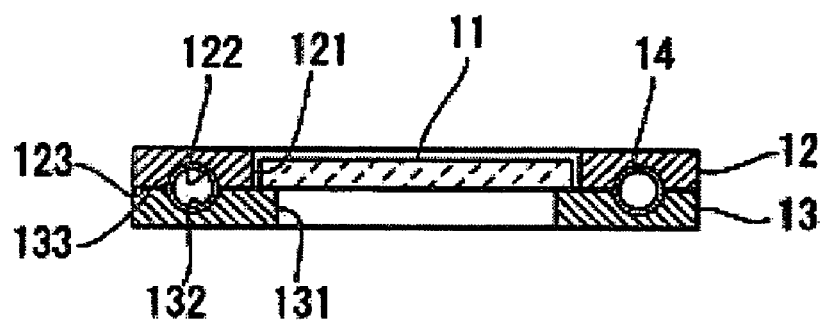

F I G. 8A
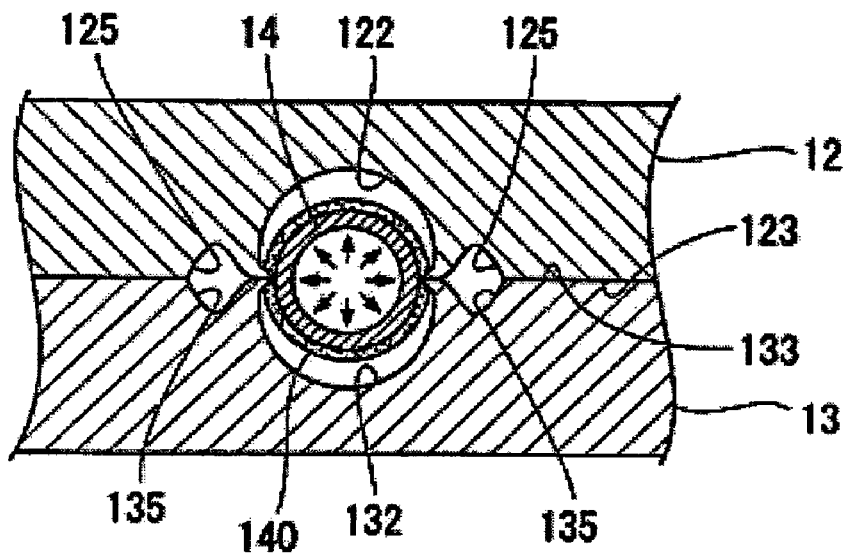
F I G. 8B
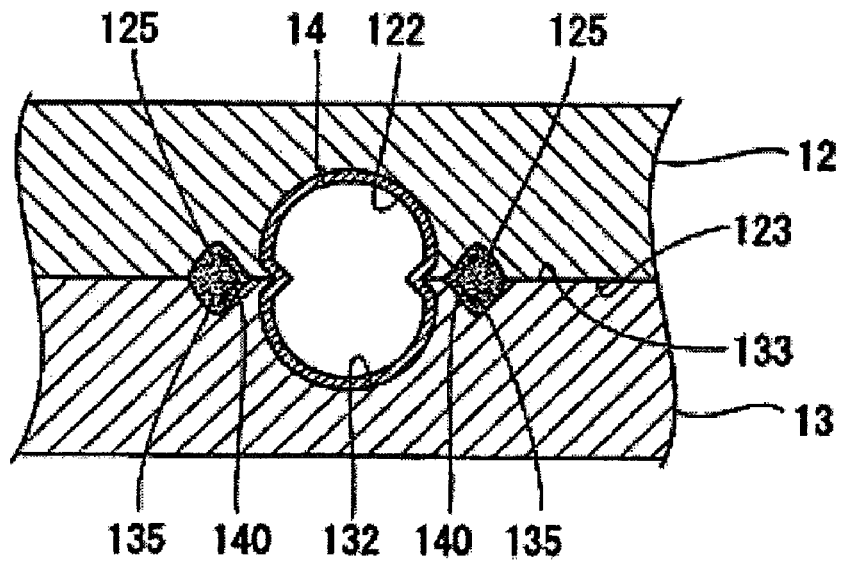

FIG. 9
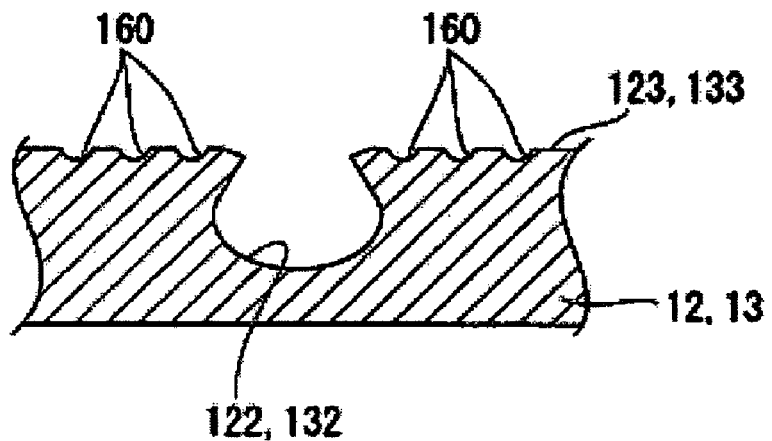
FIG. 10
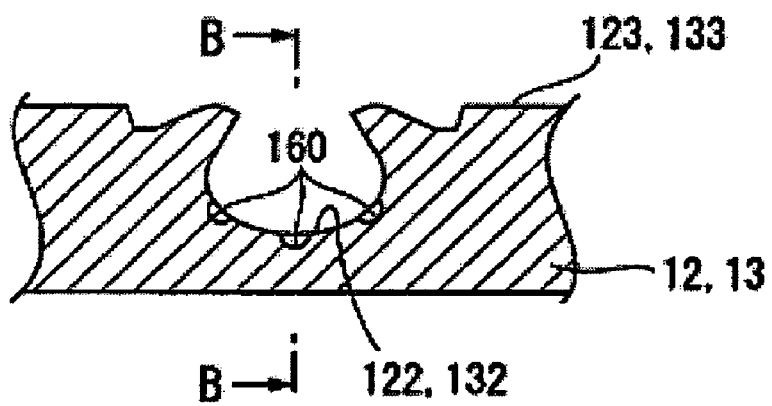
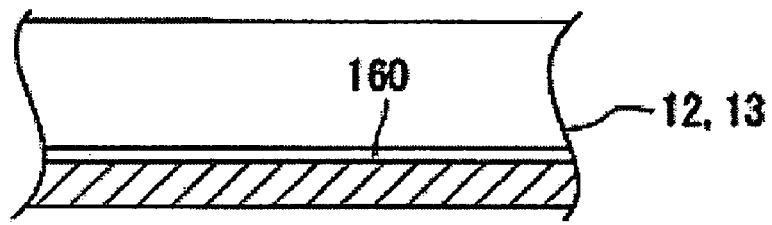
B-B

F I G. 1 1
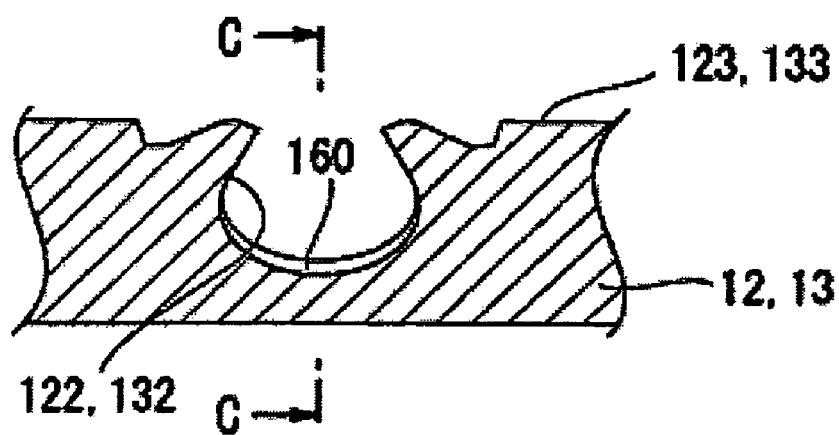
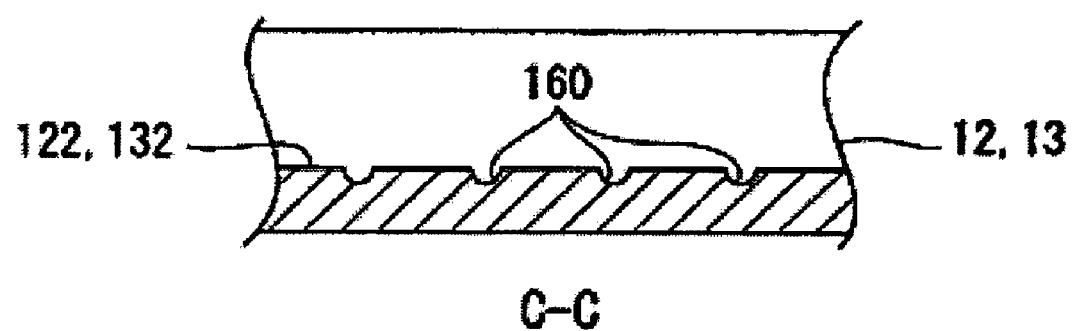
C-C

D-D

F I G. 17
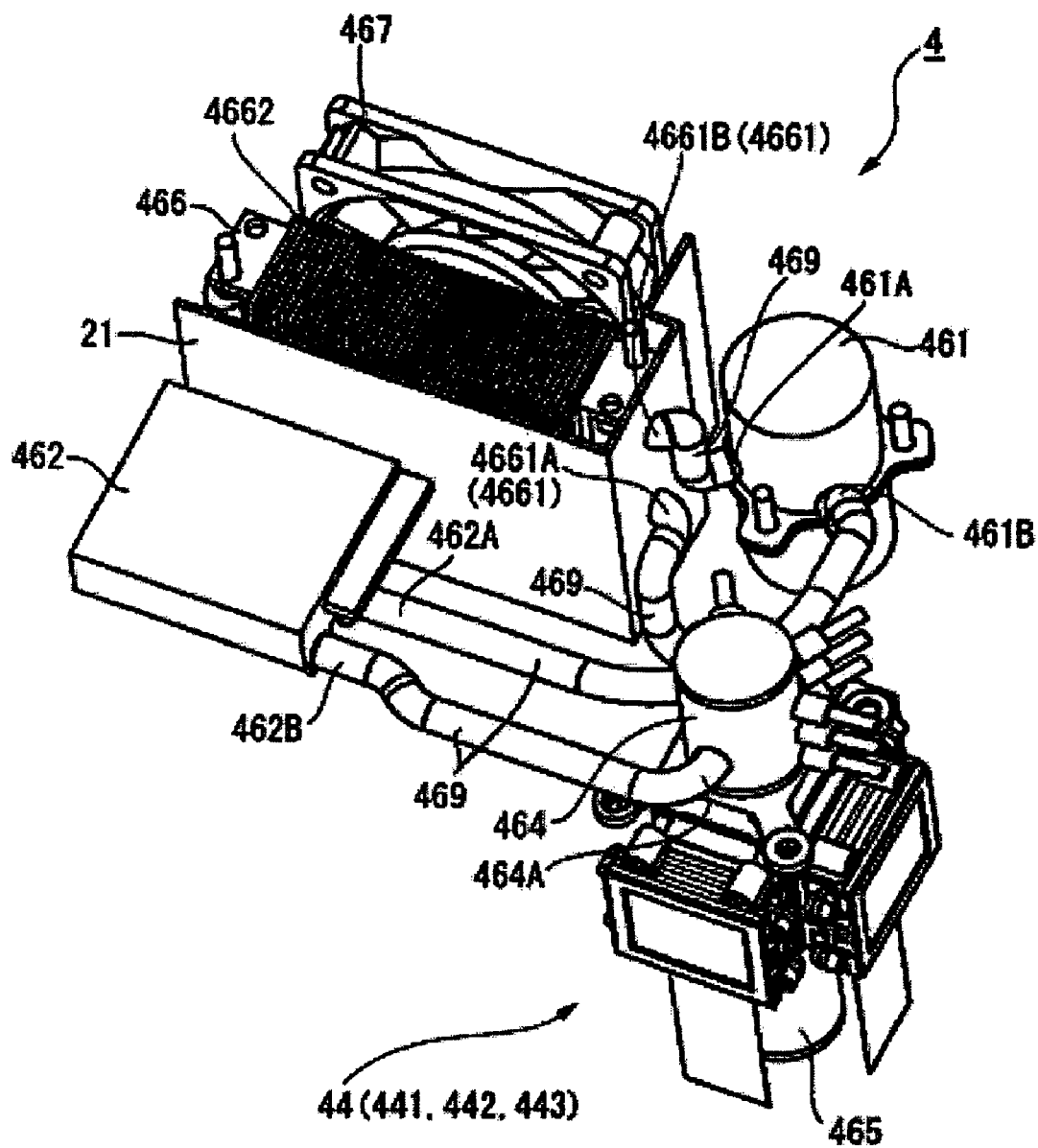

F I G. 23A
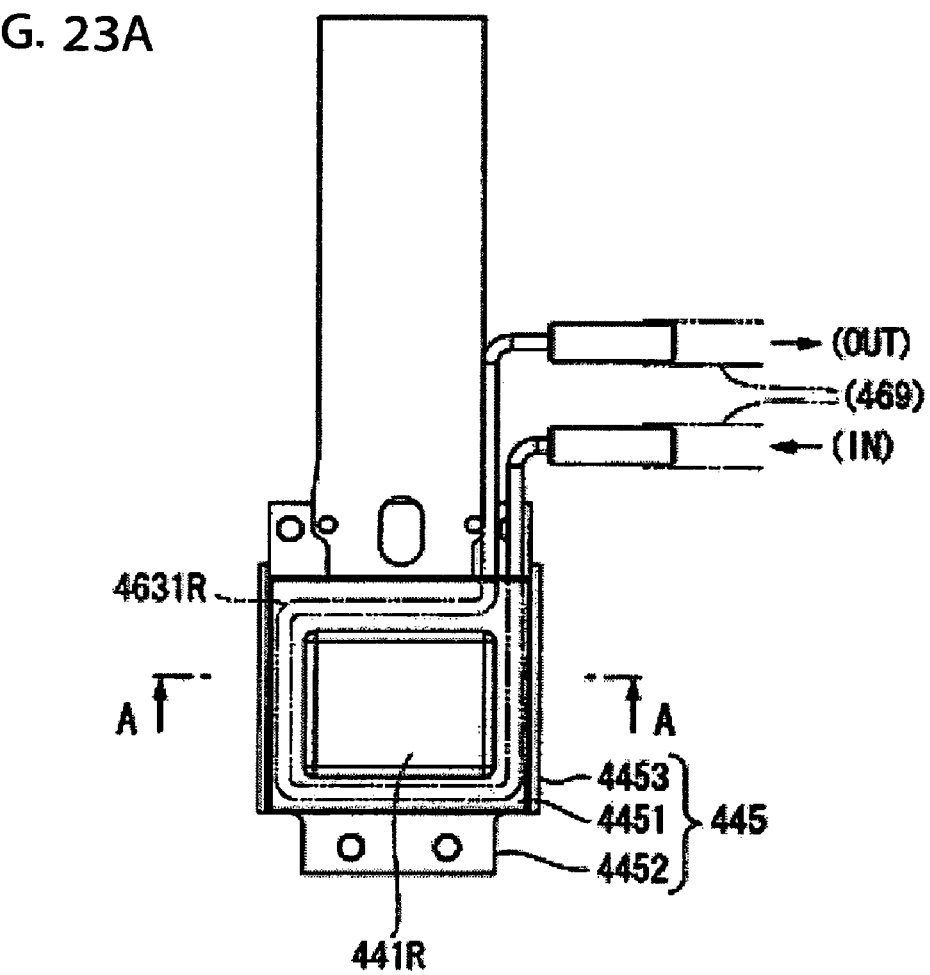
F I G. 23B
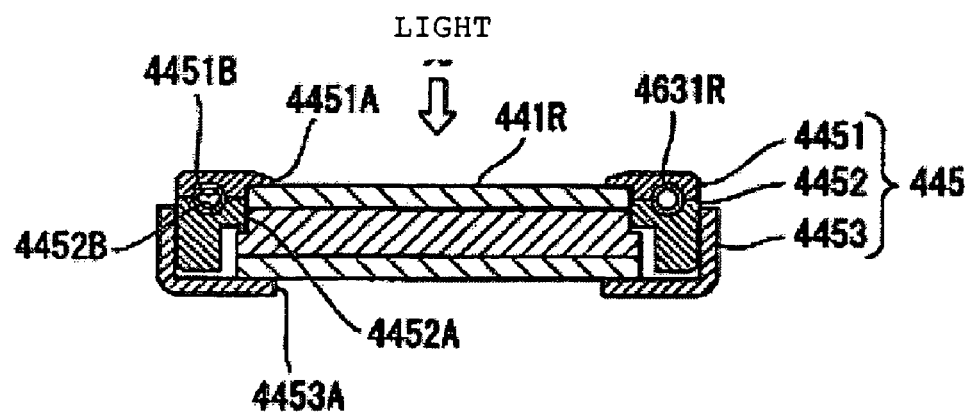

F I G. 25A
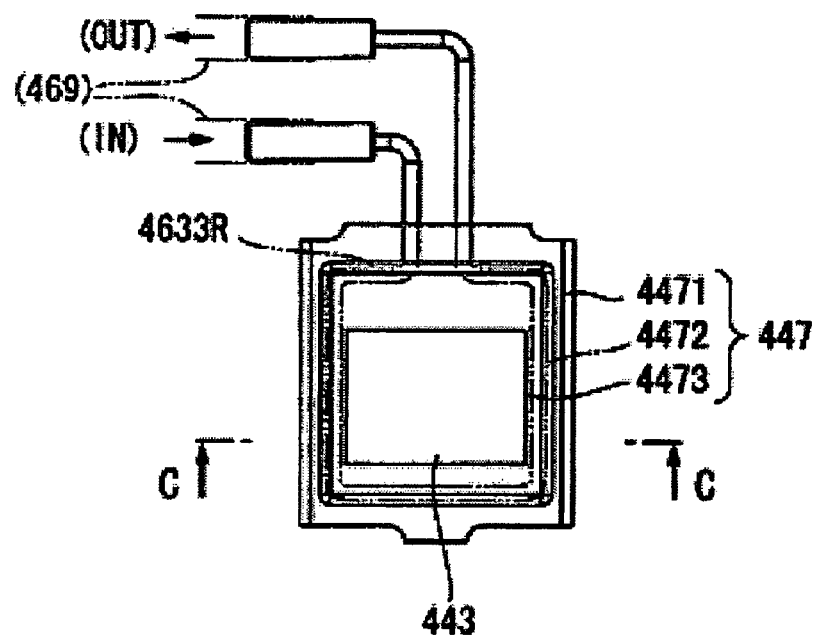
F I G. 25B
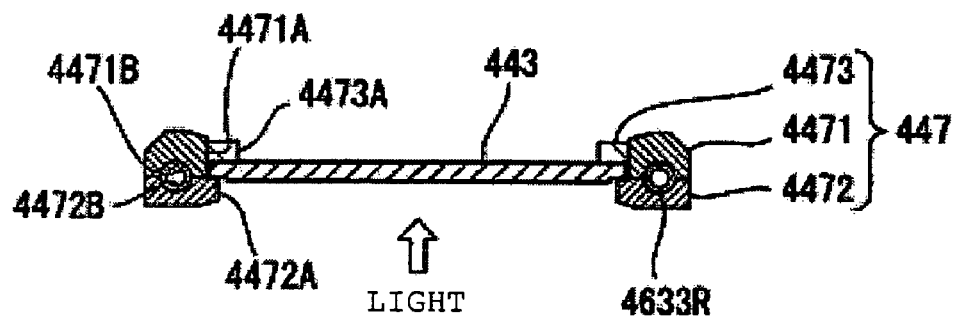

F I G. 2 8
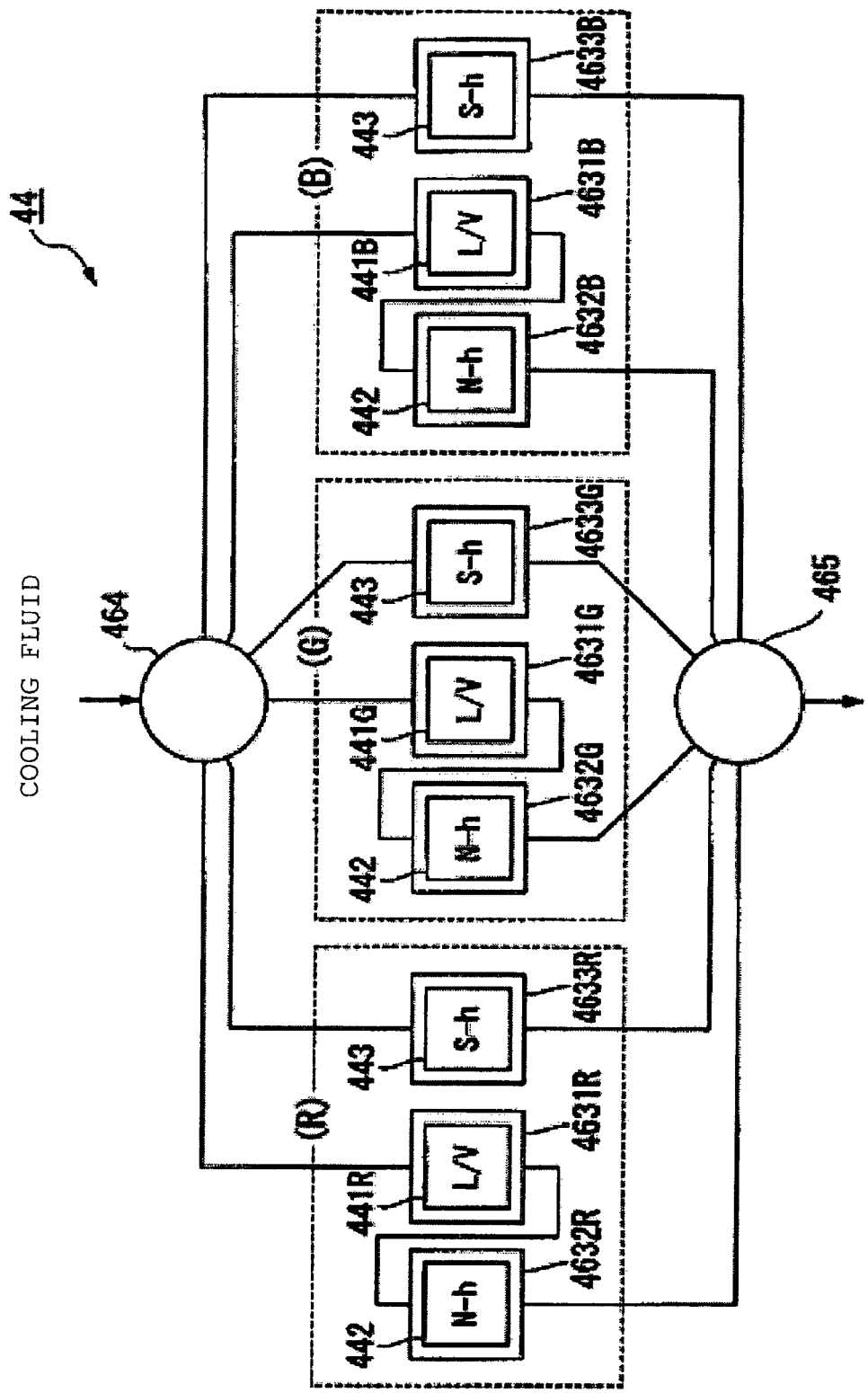

MANUFACTURING METHOD FOR COOLING UNIT HAVING A PAIR OF TABULAR MEMBERS, COOLING UNIT, OPTICAL DEVICE, AND PROJECTOR

BACKGROUND

1. Technical Field

The present invention relates to a manufacturing method for a cooling unit, a cooling unit, an optical device, and a projector.

2. Related Art

As a cooling unit using a cooling fluid, there is a cooling unit that includes a cooling plate having a structure in which a metal pipe serving as a coolant path is arranged between inner surfaces of a pair of metal plates combined to be opposed to each other. This cooling plate is manufactured by forming a pipe housing groove larger than the metal pipe in at least one of the pair of metal plates and integrally combining the metal pipe and the pair of metal plates. In a manufacturing process of the cooling plate, a pressurized fluid is supplied into the metal pipe after the combination to expand a diameter of the metal pipe and closely attach the metal pipe in the pipe housing groove (see, for example, JP-A-2002-156195).

In a manufacturing method for the cooling unit, the metal plates and the metal pipe are combined by forming the pipe housing groove in a reverse taper shape with respect to a mating surface of the metal plate and, in expanding the diameter of the metal pipe, causing an edge portion (an undercut portion) of the groove to cut into the metal pipe.

However, in the manufacturing method, cutting using a special cutting tool is required for forming the undercut portion. Therefore, it is difficult to realize a reduction in cost and cope with a reduction in size of the cooling unit.

SUMMARY

An advantage of some aspects of the invention is to provide a manufacturing method for a cooling unit, a cooling unit, an optical device, and a projector that are suitable for a reduction in cost and a reduction in size.

A manufacturing method according to a first aspect of the invention is a method of manufacturing a cooling unit that includes a cooling plate in which a cooling fluid flows. The cooling plate has a structure in which a pair of tabular members are arranged to be opposed to each other with a cooling pipe, through which the cooling fluid flows, sandwiched between the tabular members. The manufacturing method includes: forming grooves for housing the cooling pipe in respective opposed surfaces of the pair of tabular members; forming projections projecting to inner sides of the grooves by applying an external force or joining a predetermined member to the respective opposed surfaces of the pair of tabular members; and combining each of the pair of tabular members and the cooling pipe by housing the cooling pipe in the grooves and expanding a diameter of the cooling pipe.

In the manufacturing method, the projections are formed by applying an external force or joining the predetermined member to the respective opposed surface of the pair of tabular members and the projections cut into the cooling pipe when a diameter of the cooling pile is expanded. Consequently, each of the pair of tabular members and the cooling pipe are combined. The projections are formed by the application of an external force or the joining of the predetermined member. This makes it possible to reduce a manufacturing time and makes it easy to cope with a reduction in size of the cooling unit compared with cutting using a special cutting tool.

Therefore, according to the manufacturing method, a reduction in cost and a reduction in size of the cooling unit are realized.

In the cooling unit manufactured by the manufacturing method, since the grooves of the tabular members and the cooling pipe come into contact with each other, the grooves and the cooling pipe are thermally connected. As a result, heat of an object to be cooled coming into contact with the tabular member is removed by the cooling fluid flowing through the cooling pipe. In the structure in which the cooling pipe is disposed inside the cooling plate, only a relatively small joining portion for forming a path for the cooling fluid is required, a risk of fluid leakage is low. In addition, since a uniform and smooth flow path is formed in a flowing direction of the cooling fluid, a piping resistance is low.

In the manufacturing method, it is possible to form the grooves using a casting method or a forging method.

It is also possible to form the projections using the forging method.

With the casting method or the forging method, it is easy to realize a reduction in cost according to mass production.

In the manufacturing method, in the projection forming step, it is possible to form the projections in a short time by pressing a predetermined die against the respective opposed surfaces of the pair of tabular members to plastically deform portions adjacent to the grooves.

For example, in the groove forming step, banks adjacent to the grooves are formed on the respective opposed surfaces of the pair of tabular members in addition to the grooves. In the projection forming step, a predetermined die is pressed against the banks to plastically deform the portions adjacent to the grooves.

Consequently, it is possible to plastically deform the portions adjacent to the grooves easily by pressing the banks formed in positions adjacent to the grooves.

Alternatively, in the groove forming step, banks adjacent to the grooves and recesses arranged on outer sides of the banks with respect to the grooves are formed on the respective opposed surfaces of the pair of tabular members in addition to the grooves. In the projection forming step, a predetermined die is pressed against the banks to plastically deform portions adjacent to the grooves.

Consequently, since the banks are formed in the positions adjacent to the grooves and the recesses are formed on the outer sides of the banks, it is possible to plastically deform the portions adjacent to the grooves easily by pressing the banks.

In the manufacturing method, in the projection forming step, it is also possible to form the projections in a short time by joining another member, in which openings corresponding to the grooves and projections projecting to inner sides of the openings are formed, to the respective opposed surfaces of the pair of tabular members.

In the manufacturing method, in the projection forming step, it is also possible to form the projections in a short time by joining a separate member, in which openings corresponding to the grooves are formed, to the respective opposed surfaces of the pair of tabular members and pressing a predetermined die against one surface of the separate member to plastically deform portions adjacent to the openings.

The manufacturing method may further include filling a thermally-conductive material in a gap between the grooves and the cooling pipe.

Consequently, it is possible to improve thermal conductivity between the tabular members and the cooling pipe by filling the thermally-conductive material.

Thermal conductivity of the thermal-conductive material is preferably equal to or larger than 3 W/(m·K) and, more preferably, equal to or larger than 5 W/(m·K). Thermal conductivity of the thermally-conductive material less than 3 W/(m·K) is not preferable because heat of the tabular members less easily moves to the cooling pipe at the thermal conductivity. When thermal conductivity of the thermally-conductive material is equal to or larger than 5 W/(m·K), heat of the tabular members satisfactorily moves to the cooling pipe.

In this case, for example, the thermally-conductive material contains at least one of a resin material mixed with a metal material, a resin material mixed with a carbon material, and hot-melt adhesive.

The thermally-conductive material preferably has elasticity within an operating temperature range of the cooling plate.

Since the thermally-conductive material has elasticity, the thermally-conductive material expands and contracts according to a change in a gap between the tabular members and the cooling pipe involved in thermal deformation or the like. As a result, thermal connection between the tabular members and the cooling pipe is stably maintained.

It is preferable that supplementary grooves, which communicate with the gap between the grooves and the cooling pipe and in which the thermally-conductive material is stored temporarily, are formed at least one of the pair of tabular members.

In this case, for example, in the groove forming step, the supplementary grooves are formed in inner surfaces of the grooves and/or at least one opposed surface of the pair of tabular members.

With the supplementary grooves, an amount of arrangement of the thermally-conductive material is appropriately adjusted according to a volume of the gap between the tabular members and the cooling pipe. As a result, thermal connection between the tabular members and the cooling pipe is stably maintained.

In the filling step, it is possible to soften and fluidize the thermally-conductive material to fill the thermally-conductive material.

In this case, for example, the thermally-conductive material is softened by heat of the cooling pipe in the diameter expanding step.

Since the thermally-conductive material is softened and fluidized, the thermally-conductive material is filled over an entire area of the gap.

A cooling unit according to a second aspect of the invention is manufactured by the manufacturing method described above.

With the cooling unit, a reduction in cost and a reduction in size of the cooling unit are realized.

An optical device according to a third aspect of the invention is an optical device including an optical modulator that modulates a light beam emitted from a light source according to image information to form an optical image. At least the optical modulator is held by a cooling unit manufactured by the manufacturing method.

With the optical device, a reduction in cost and a reduction in size of the optical device and efficiency of cooling are realized.

A projector according to a fourth aspect of the invention includes: a light source device; an optical device in which at least an optical modulator that modulates a light beam emitted from the light source device according to image information to form an optical image is held by a cooling unit manufactured by the manufacturing method described above; and a projecting optical device that magnifies and projects the optical image formed in the optical device.

With the projector, a reduction in cost and a reduction in size of the projector and efficiency of cooling are realized.

BRIEF DESCRIPTION OF THE DRAWINGS

The invention will be described with reference to the accompanying drawings, wherein like numbers reference like elements.

FIG. 1A is a plan view showing a constitution of a cooling unit.

FIG. 1B is a sectional view along line A-A in FIG. 1A.

FIGS. 8A and 8B are diagrams for explaining a state in which a thermally-conductive material is filled.

FIG. 9 is a diagram showing an example in which supplementary grooves are formed in a tabular member.

FIG. 10 is a diagram showing an example in which supplementary grooves are formed in a tabular member.

FIG. 11 is a diagram showing an example in which supplementary grooves are formed in a tabular member.

FIG. 17 is a perspective view of an optical device and a liquid cooling unit in the projector viewed from below.

FIG. 23A is an assembled front view of the liquid crystal panel holding frame.

FIG. 23B is a sectional view along line A-A in FIG. 23A.

FIG. 25A is an assembled front view of an emission side sheet polarizer holding frame.

FIG. 25B is sectional view along line C-C in FIG. 25A.

FIG. 28 is a diagram showing another modification of the piping system.

DESCRIPTION OF EXEMPLARY EMBODIMENTS

Figure 2:
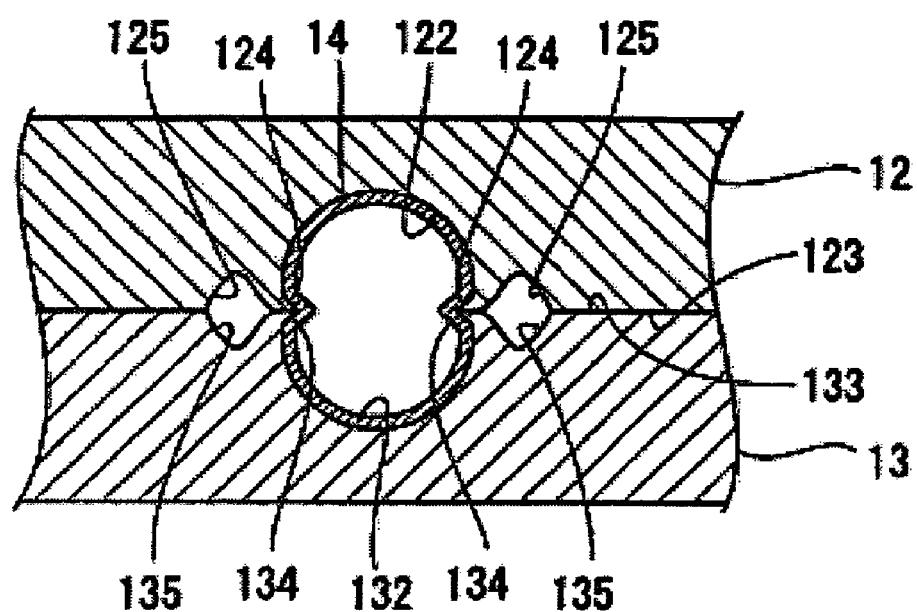
FIG. 2 is a partial sectional view showing grooves of tabular members in an enlarged state.

An embodiment of the invention will be hereinafter explained with reference to the accompanying drawings. In the figures, scales of respective components are set different from actual scales as required in order to make it possible to recognize the components on the diagrams.

Cooling Unit

FIG. 1A is a plan view showing a constitution of a cooling unit 10. FIG. 1B is a sectional view along A-A in FIG. 1A.

As shown in FIGS. 1A and 1B, the cooling unit 10 holds a peripheral edge of a transmission optical element 11 and cools the optical element 11. The cooling unit 10 includes a pair of tabular members 12 and 13 that holds the optical element 11 and a cooling pipe 14 sandwiched by the pair of tabular members 12 and 13.

Various optical elements such as a phase difference plate and a view angle correction plate are applied as the optical element 11 other than a liquid crystal panel and a sheet polarizer. The invention is applicable not only to the transmission optical element but also to a reflection optical element. The invention is applicable not only to cooling of the optical element but also to cooling of other objects. An example in which the cooling unit according to the first aspect of the invention is applied to a cooling structure for the liquid crystal panel and the sheet polarizer will be explained in detail later.

The tabular members 12 and 13 are frame members of substantially a rectangular shape in a plan view, respectively. The tabular members 12 and 13 have rectangular openings 121 and 131 corresponding to transmission areas of a light beam in the optical element 11 and grooves 122 and 132 for housing the cooling pipe 14, respectively. The tabular members 12 and 13 are arranged to be opposed to each other with the cooling pipe 14 sandwiched between the tabular members 12 and 13. A thermal good conductor made of a material with high thermal conductivity is preferably used as the tabular members 12 and 13. For example, other than aluminum (234 W/(m·K)), magnesium (156 W/(m·K)), alloys of aluminum and magnesium (an aluminum alloy (about 100 W/(m·K)), and a low specific gravity magnesium alloy (about 50 W/(m·K)), etc.), various kinds of metal are applied as the tabular members 12 and 13. A material of the tabular members 12 and 13 is not limited to metal materials and may be other materials (a resin material, etc.) with high thermal conductivity (e.g., equal to or higher than 5 W/(m·K)).

The cooling pipe 14 consists of a pipe or a tube having, for -example, an annular section and extending along a central axis of the section. The cooling pipe 14 is bent according to a planar shape of the grooves 122 and 132 of the tabular members 12 and 13. A thermal good conductor made of a material with high thermal conductivity is preferably used as the cooling pipe 14. For example, other than aluminum (234 W/(m·K)), copper (398 W/(m·K)), stainless steel (16 W/(m·K) (austenitic), and alloys of aluminum, copper, and stainless steel, various kinds of metal are applied as the cooling pipe 14. The cooling pipe 14 is not limited to a metal materials and may be other materials (a resin material, etc.) with high thermal conductivity (e.g., equal to or higher than 5 W/(m·K)).

Specifically, as shown in FIGS. 1A and 1B, the cooling pipe 14 is disposed on an outer side of the peripheral edge of the optical element 11 and along substantially the entire peripheral edge of the optical element 11. In respective opposed surfaces 123 and 133 (inner surfaces or mating surfaces) of the tabular members 12 and 13, the grooves 122 and 132 of substantially a semicircular shape in sections are formed along substantially entire edges of the openings 121 and 131. The grooves 122 and 132 are generally in a mirror symmetrical relation in shapes with each other. The tabular members 12 and 13 are joined to each other in a state in which the cooling pipe 14 is housed in the respective grooves 122 and 132. In this embodiment, the cooling pipe 14 is a circular pipe and an outer diameter thereof is practically the same as thickness of the optical element 11.

FIG. 2 is a partial sectional view showing the grooves 122 and 132 of the tabular members 12 and 13 in an enlarged state.

As shown in FIG. 2, projections 124 and 134 projecting to inner sides of the grooves 122 and 132 are provided in the tabular members 12 and 13, respectively. The projections 124 and 134 cut into and engage with an outer surface of the cooling pipe 14, whereby the tabular members 12 and 13 and the cooling pipe 14 are integrated. The outer surface of the cooling pipe 14 is closely attached to inner surfaces of the grooves 122 and 132 of the tabular members 12 and 13 through diameter expansion processing for the cooling pipe 14 described later.

The projections 124 and 134 are formed by, after forming the grooves 122 and 132 of the tabular members 12 and 13, applying an external force to positions adjacent to the grooves 122 and 132 on the opposed surfaces 123 and 133 to plastically deform the positions. Therefore, recesses 125 and 135, which are traces of the application of the force, are present in the positions adjacent to the grooves 122 and 132 on the opposed surfaces 123 and 133 of the tabular members 12 and 13, respectively.

Referring back to FIG. 1A, an inlet section (IN) for a cooling fluid is disposed at one end of the cooling pipe 14 and an outlet section (OUT) is disposed at the other end thereof. The inlet section and the outlet sections of the cooling pipe 14 are connected to piping for cooling fluid circulation, respectively. Not-shown devices for cooling fluid circulation such as a fluid compressing unit, various tanks, and a radiator are arranged on a path of the cooling fluid.

The cooling fluid flowing into the cooling pipe 14 from the inlet section (IN) flows through the entire peripheral edge of the optical element 11 and flows out from the outlet section (OUT). The cooling fluid deprives the optical element 11 of heat while flowing through the cooling pipe 14. In other words, the heat of the optical element 11 is transmitted to the cooling fluid in the cooling pipe 14 via the tabular members 12 and 13 and carried to the outside.

In this embodiment, the cooling pipe 14 is closely attached to the grooves 122 and 132 of the tabular members 12 and 13 through the diameter expansion processing for the cooling pipe 14 described later. Thus, heat transferability between the tabular members 12 and 13 and the cooling pipe 14 is high. Since the cooling pipe 14 is disposed along substantially the entire peripheral edge of the optical element 11, a heat transfer area is enlarged. Therefore, the optical element 11 is efficiently cooled by the cooling fluid flowing through the cooling pipe 14.

In the structure in which the cooling pipe 14 is disposed inside the frame members (the tabular members 12 and 13)

holding the optical element 11, since only a relatively small joining section for forming a path for the cooling fluid is required, a risk of fluid leakage is low. In addition, since a uniform and smooth flow path in a flowing direction of the cooling fluid is low, a piping resistance is low. Moreover, in this structure, the frame members serve as both holding means and cooling means for the optical element 11. As a result, there is an advantage that it is easy to realize a reduction in size of an apparatus including the optical element 11.

It is possible to improve the heat transferability between the grooves 122 and 132 and the cooling pipe 14 by filling a thermally-conductive material in a gap between the grooves 122 and 132 in the tabular members 12 and 13 and the cooling pipe 14. Filling of the thermally-conductive material will be described later.

Manufacturing method for the cooling unit

A manufacturing method for the cooling unit 10 will be explained.

FIGS. 3A to 3D are diagrams for explaining an example of the manufacturing method for the cooling unit 10. This manufacturing method has a groove forming step, a projection forming step, and a combining step.

Figure 3A:
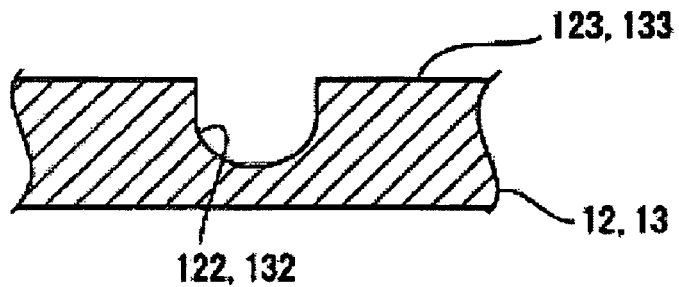
FIGS. 3A to 3D are diagrams for explaining an example of a manufacturing method for a cooling unit.

First, in the groove forming step, as shown in FIG. 3A, the grooves 122 and 132 of a substantially U shape in sections or a substantially semicircular shape in sections for housing a cooling pipe are formed in the respective opposed surfaces 123 and 133 of the pair of tabular members 12 and 13. In this step, the tabular member 12 (13) including the groove 122 (132) is integrally formed using a casting method (a die-cast method, etc.) or a forging method (cold/hot forging, etc.). In the casting method, for example, a melted material is poured into a die of a predetermined shape and solidifying the material to obtain a tabular member of a desired shape. In the forging method, for example, a material member is sandwiched between a pair of dies and compressed to obtain a tabular member of a desired shape. The grooves 122 and 132 may be formed by cutting. However, with the casting method or the forging method, it is easy to realize a reduction in cost according to mass production.

Figure 3B:
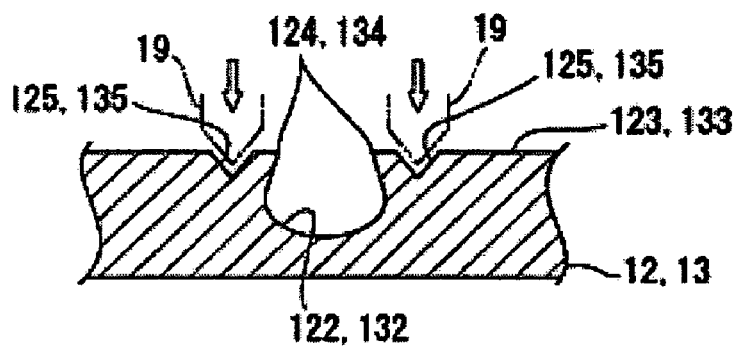

In the projection forming step, as shown in FIG. 3B, the projections 124 and 134 projecting to the inner sides of the grooves 122 and 132 are formed. In this step, the forging method is used. Predetermined dies 19 (arrow dies, bits, etc.) are pressed against the respective opposed surfaces 123 and 133 of the tabular members 12 and 13 to form the recesses 125 and 135, which are traces of the dies 19, in positions adjacent to the grooves 122 and 132 with pressing or striking (crashing). In this case, portions between the grooves 122 and 132 and the recesses 125 and 135 (portions adjacent to the grooves 122 and 132) are pushed by the dies 19 and plastically deformed toward the inner sides of the grooves 122 and 132. As a result, edges of the grooves 122 and 132 fall down to the inner sides. Consequently, the projections 124 and 134 projecting to the inner sides of the grooves 122 and 132 and having sharp tips are formed. It is possible to perform the pressing or the striking in an extremely short time. The pressing and the striking are preferably applied to machining of a small object as well.

The formation of the recesses 125 and 135 and the projections 124 and 134 is performed over an entire axial direction of the cooling pipe 14. The recesses 125 and 135 and the projections 124 and 134 may be continuously formed along an axial direction of the grooves 122 and 132 or may be intermittently or partially formed. It is relatively difficult to cause the projections 124 and 134 to cut into a bent section of the cooling pipe 14 (a curved section of the cooling pipe 14 shown in FIG. 1A). Thus, it is advisable to remove the recesses 125 and 135 and the projections 124 and 134 or reduce a size of the projections 124 and 134 in positions corresponding to the bent sections. A shape of the dies 19 is appropriately set according to materials, shapes, or the like of the tabular members 12 and 13 and the cooling pipe 14.

Figure 3C:
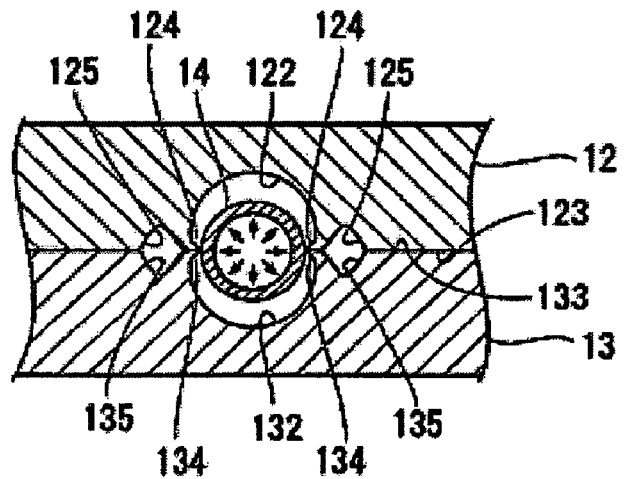

In the combining step as shown in FIG. 3C, the tabular members 12 and 13 are arranged to be opposed to each other in a state in which the cooling pipe 14 is housed in the respective grooves 122 and 132, the opposed surfaces 123 and 133 are held in a state in which the opposed surfaces 123 and 133 are in abutment against each other, and a diameter of the cooling pipe 14 is expanded. The holding of the tabular members 12 and 13 is performed by mechanical grapping means such as a clamp or fastening by bolts or the like. The expansion of a diameter is performed by pressurizing and supplying fluid into the cooling pipe 14 and repeatedly performed for plural number of times as required.

Figure 3D:
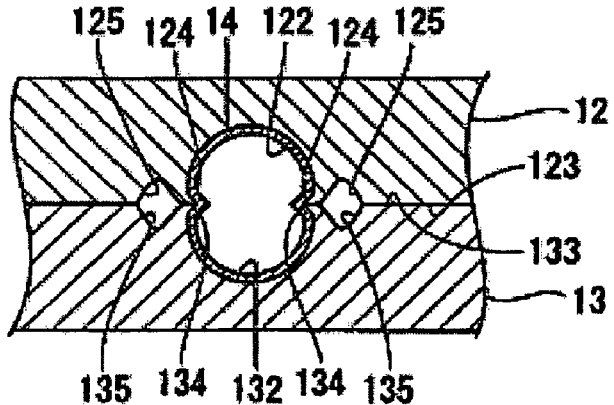

According to the expansion of the diameter of the cooling pipe 14, as shown in FIG. 3D, the outer surface of the cooling pipe 14 is closely attached to the inner surfaces of the grooves 122 and 132. Each of the pair of tabular members 12 and 13 and the cooling pipe 14 are thermally connected. In expanding the diameter, since the projections 124 and 134 cut into and engage with the outer surface of the cooling pipe 14, the tabular members 12 and 13 and the cooling pipe 14 are combined. Consequently, a cooling structure (a cooling plate), in which the pair of tabular members 12 and 13 are arranged to be opposed to each other with the cooling pipe 14 sandwiched between the tabular members 12 and 13, is manufactured.

Thereafter, as shown in FIGS. 1A and 1B, the optical element 11 is fixed to the tabular members 12 and 13 and the cooling pipe 14 is connected to a supply system for the cooling fluid. Consequently, the cooling unit 10 is completed.

As explained above, in the manufacturing method for the cooling unit 10 in this embodiment, the projections 124 and 134 are formed by the application of an external force such as pressing or striking to the opposed surfaces 123 and 133 of the pair of tabular members 12 and 13. This makes it possible to reduce a manufacturing time and makes it easy to cope with a reduction in size of the cooling unit 10 compared with cutting. Therefore, according to the manufacturing method, it is possible to realize a reduction in cost and a reduction in size of the cooling unit 10 manufactured by the manufacturing method.

FIGS. 4A and 4B to FIGS. 7A and 7B are diagrams for explaining modifications of the manufacturing method in FIG. 3. Note that components having functions identical with those already explained are denoted by the identical reference numerals and explanations of the components are omitted or simplified.

Figure 4A:
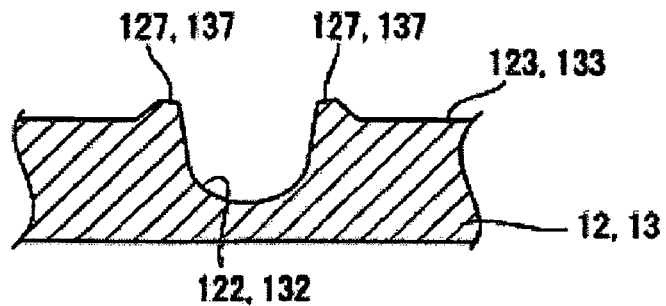
FIGS. 4A and 4B are diagrams for explaining a modification of the manufacturing method in FIGS. 3A to 3D.

In an example in FIG. 4, in the groove forming step, in addition to the grooves 122 and 132, banks 127 and 137 adjacent to the grooves 122 and 132 are formed in the respective opposed surfaces 123 and 133 of the pair of tabular members 12 and 13 (FIGS. 4A). Further, slopes for die cutting (die cutting slopes) are provided on wall surfaces of the grooves 122 and 132. The banks 127 (137) are projections formed to project from the opposed surface 123 (133) of the tabular member 12 (13). The die cutting slope is provided to simplify die release. The die cutting slope is provided such that a width of the groove 122 (132) gradually widens toward an opening of the groove 122 (132). Width and height of the banks 127 and 137, an angle of the die cutting slope, and the like are appropriately set according to materials, shapes, and the like of the tabular members 12 and 13 and a cooling pipe. It is possible to form even the tabular members 12 and 13 having such a shape easily and at low cost by using the casting method (the die cast method, etc.) or the forging method (the cold/hot forging, etc.).

Figure 4B:
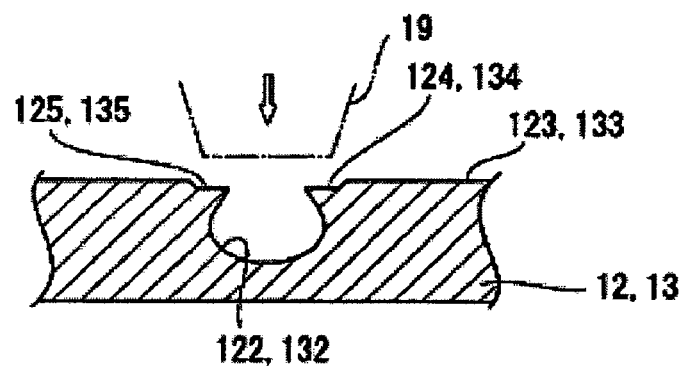

In the projection forming step, the banks 127 and 137 are plastically deformed using the forging method (FIG. 4B). The predetermined dies 19 (arrow dies, bits, etc.) are pressed against the banks 127 and 137 on the respective opposed surfaces 123 and 133 of the tabular members 12 and 13 to perform pressing or striking (crashing). In this case, the banks 127 and 137 are pushed by the dies 19 and plastically deformed toward the inner sides of the grooves 122 and 132. The recesses 125 and 135 (stepped-down sections), which are traces of the dies, are formed in the positions adjacent to the grooves 122 and 132. It is also possible that the recesses 125 and 135 (the stepped-down sections) are not formed and application positions of a force may be at the same height as the opposed surfaces 123 and 133 (a state in which the opposed surfaces 123 and 133 are flat).

Corners of the banks 127 and 137 fall down to the inner sides of the grooves 122 and 132, whereby the projections 124 and 134 projecting to the inner sides of the grooves 122 and 132 and having sharp tips are formed. The wall surfaces of the grooves 122 and 132 provided with the slopes fall down to the inner sides, whereby the projections 124 and 134 are formed in a so-called reverse taper shape. Thereafter, the combining step according to the diameter expansion of the cooling pipe 14 is performed (see FIG. 3).

In this example, since the banks 127 and 137 are formed, plastic deformation at the time of formation of the projections 124 and 134 is facilitated. Moreover, since the projections 124 and 134 are formed in the reverse taper shape, combinability of each of the pair of tabular members 12 and 13 and the cooling pipe 14 (see FIG. 3) is improved.

Figure 5A:
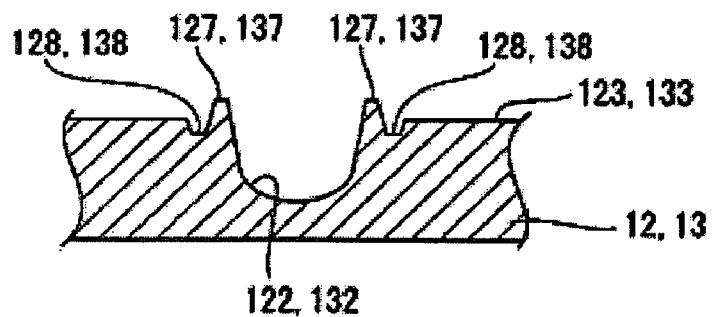
FIGS. 5A and 5B are diagrams for explaining a modification of the manufacturing method in FIGS. 3A to 3D.

In an example in FIG. 5, in the groove forming step, the banks 127 and 137 adjacent to the grooves 122 and 132 and recesses 128 and 13.8 arranged to be adjacent to outer sides of the banks 127 and 137 with respect to the grooves 122 and 132 are formed on the respective opposed surfaces 123 and 133 of the pair of tabular members 12 and 13 in addition to the grooves 122 and 132 (FIG. 5A). Moreover, slopes for die cutting (die cutting slopes) are provided on wall surfaces of the grooves 122 and 132. As in the example in FIG. 4, the banks 127 (137) are projections formed to project from the opposed surface 123 (133) of the tabular member 12 (13). The die cutting slope is provided such that a width of the groove 122 (132) gradually widens toward an opening of the groove 122 (132). The recesses 128 (138) are formed to be recessed from the opposed surface 123 (133) of the tabular member 12 (13) and share a part of wall surfaces with the banks 127 and 137. Width and depth of the recesses 128 and 138, width and height of the banks 127 and 137, an angle of the die cutting slops, and the like are appropriately decided according to materials, shapes, and the like of the tabular members 12 and 13 and the cooling pipe 14. It is possible to form even the tabular members 12 and 13 having such a shape easily and at low cost by using the casting method (the die cast method, etc.) or the forging method (the cold/hot forging, etc.).

Figure 5B:
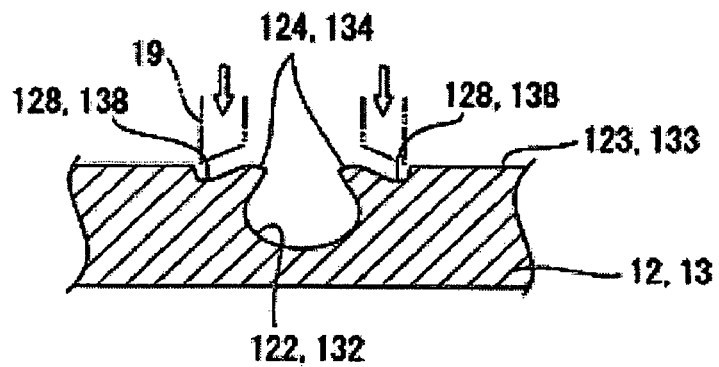

In the projection forming step, the banks 127 and 137 are plastically deformed using the forging method (FIG. 5B). The predetermined dies 19 (arrow dies, bits, etc.) are pressed against the banks 127 and 137 on the respective opposed surfaces 123 and 133 of the tabular members 12 and 13 to perform pressing or striking (crashing). In this case, the banks 127 and 137 are pushed by the dies 19 and plastically deformed toward the inner sides of the grooves 122 and 132. The recesses 128 and 138, which are expanded following the deformation of the banks 127 and 137, are formed in the positions adjacent to the grooves 122 and 132. In this example, since the recesses 128 and 138 are formed, plastic deformation of the banks 127 and 137 are performed easily with a relatively small force. This is advantageous in preventing deformation of the tabular members 12 and 13 involved in formation of the projections 124 and 134.

Corners of the banks 127 and 137 fall down to the inner sides of the grooves 122 and 132, whereby the projections 124 and 134 projecting to the inner sides of the grooves 122 and 132 and having sharp tips are formed. The wall surfaces of the grooves 122 and 132 provided with the slopes fall down to the inner sides, whereby the projections 124 and 134 are formed in a so-called reverse taper shape. Thereafter, the combining step according to the diameter expansion of the cooling pipe 14 is performed (see FIG. 3).

In this example, since the banks 127 and 137 and the recesses 128 and 138 are formed, plastic deformation at the time of formation of the projections 124 and 134 is facilitated. Moreover, since the projections 124 and 134 are formed in the reverse taper shape, combinability of each of the pair of tabular members 12 and 13 and the cooling pipe 14 (see FIG. 3) is improved.

Figure 6A:
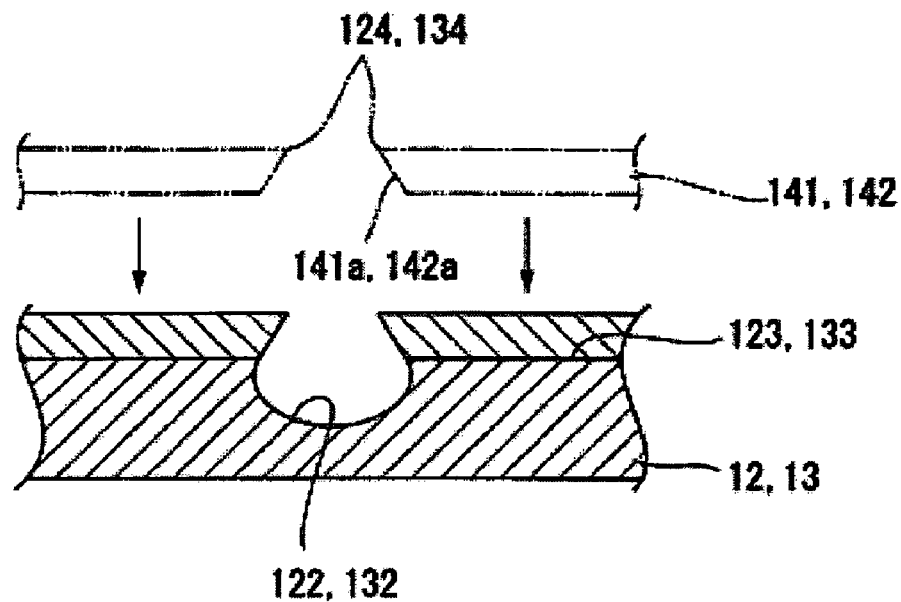
FIGS. 6A and 6B are diagrams for explaining a modification of the manufacturing method in FIGS. 3A to 3D.

In an example in FIG. 6, in the projection forming step, separate members 141 and 142 are joined to the respective opposed surfaces 123 and 133 of the pair of tabular members 12 and 13 (FIG. 6A). An opening 141*a* (142*a*) having substantially the same planar shape as the groove 122 (132) in association with the groove 122 (132) of the tabular member 12 (13) and a projection 124 (134) projecting to an inner side of the opening 141*a* (142*a*) are formed in the members 141 and 142 in advance. It is possible to form the members 141 and 142 using the casting method (the die cast method, etc.) or the forging method (the cold/hot forging, etc.). The opening 141*a* (142*a*) and the projection 124 (134) may be formed by cutting. However, a reduction in cost according to mass production is more easily realized when the opening 141*a* (142*a*) and the projection 124 (134) are formed in desired shapes by the casting method or the forging method.

Figure 6B:
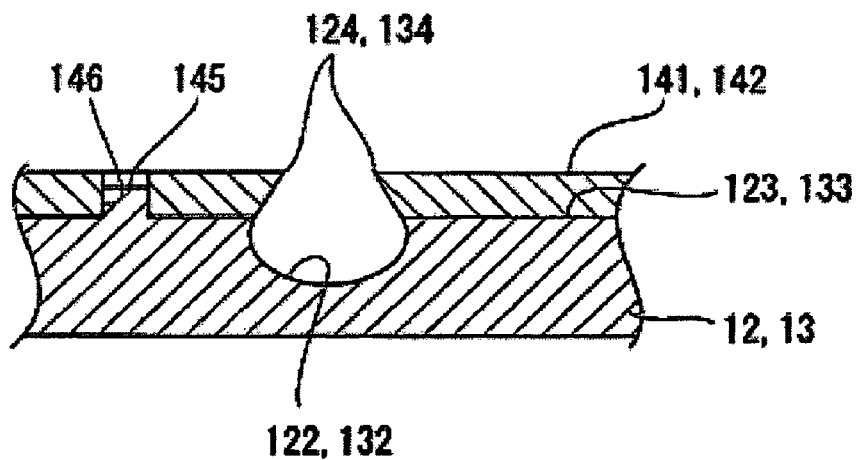

For joining the tabular members 12 and 13 and the separate members 141 and 142, it is possible to apply various methods such as fastening by screws or the like, bonding, welding, and mechanical joining such as fitting. For example, as shown in FIG. 6B, it is advisable to position the tabular member 12 (13) and the member 141 (142) with a protrusion 145 and a recess 146 and, then, fix the tabular member 12 (13) and the member 141 (142) with the joining. It is possible to perform such joining in an extremely short time. The joining is preferably applied to machining of a small object as well.

Since the members 141 and 142 are joined to the tabular members 12 and 13, the projections 124 and 134 projecting to the inner sides of the grooves 122 and 132 and having the sharp tips are disposed in opening positions of the grooves 122 and 132 of the tabular members 12 and 13. Thereafter, the combining step according to the diameter expansion of the cooling pipe 14 is performed (see FIG. 3).

In this example, the projections 124 and 134 are formed by joining of the separate members 141 and 142. This makes it possible to reduce a manufacturing time and makes it easy to cope with a reduction in size of the cooling unit compared with cutting. In addition, since plural divided grooves are formed, it is possible to form the projections 124 and 134 having various shapes such as a so-called reverse taper shape using the casting method or the forging method.

Figure 7A:
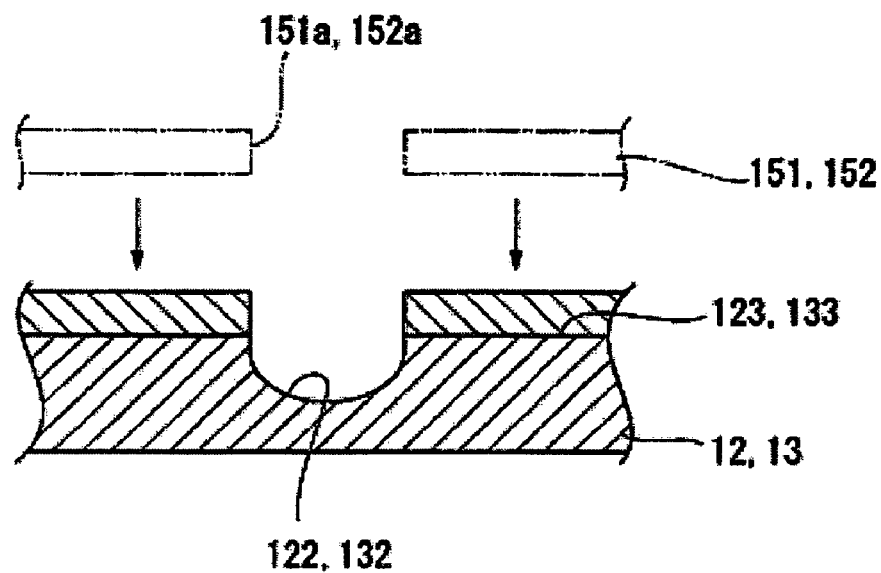
FIGS. 7A and 7B are diagrams for explaining a modification of the manufacturing method in FIGS. 3A to 3D.
Figure 7B:
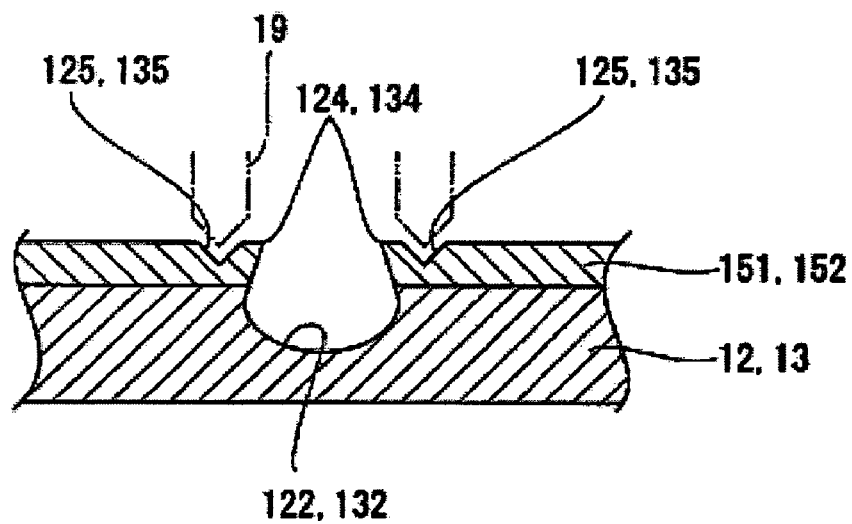

In an example in FIG. 7, in the projection forming step, separate members 151 and 152 are joined to the respective opposed surfaces 123 and 133 of the pair of tabular members 12 and 13 (FIG. 7A). Thereafter, the projections 124 and 134 are formed in the members 151 and 152 using the forging method (FIG. 7B). An opening 151a (152a) having substantially the same planar shape as the groove 122 (132) in association with the groove 122 (132) of the tabular member 12 (13) are formed in the members 151 and 152 in advance. It is possible to form the members 151 and 152 using the casting method (the die cast method, etc.) or the forging method (the cold/hot forging, etc.). As in the example in FIG. 6, for joining the tabular members 12 and 13 and the separate members 151 and 152, it is possible to apply various methods such as fastening by screws or the like, bonding, welding, and mechanical joining such as fitting. It is possible to perform such joining in an extremely short time. The joining is preferably applied to machining of a small object as well.

The members 151 and 152 are plastically deformed partially using the forging method. The predetermined dies 19 (arrow dies, bits, etc.) are pressed against positions adjacent to the openings 151a and 152a of the members 151 and 152 to perform pressing or striking (crashing). In this case, edges of the openings 151a and 152a are pushed by the dies 19 and plastically deformed toward the inner sides of the grooves 122 and 132. The recesses 125 and 135, which are traces of the dies, are formed in the positions adjacent to the openings 151a and 152a in the members 151 and 152.

In this example, the projections 124 and 134 are formed by the joining of the separate members 151 and 152 and the application of an external force to the members 151 and 152. This makes it possible to reduce a manufacturing time and makes it easy to cope with a reduction in size of the cooling unit compared with the time when cutting is used. Since a member forming the projections 124 and 134 and the tabular members 12 and 13 are separate, selectability of a material is improved.

Filling of a Thermally-conductive Material In the cooling unit, it is possible to improve the heat transferability between the grooves 122 and 132 of the tabular members 12 and 13 and the cooling pipe 14 by filling a thermally-conductive material in a gap between the tabular members 12 and 13 and the cooling pipe 14.

A thermal good conductor made of a material with high thermal conductivity is preferably used as the thermally-conductive material. Specifically, for example, a resin material mixed with a metal material, a resin material mixed with a carbon material, hot-melt adhesive, and the like are used. Thermal conductivity is preferably equal to or higher than 3 W/(m·K) and more preferably equal to or higher than 5 W/(m·K). Thermal conductivity of the hot-melt adhesive is usually equal to or higher than 5 W/(m·K). Some resin materials mixed with a metal material or a carbon material have thermal conductivity equal to or higher than 3 W/(m·K) and others have thermal conductivity equal to or higher than 10 W/(m·K). As examples of the resin materials, there are D2 by cool polymers: (registered trademark) (LCP resin mixed with a material for thermal conduction, 15 W/(m·K), coefficient of thermal expansion: $10 \times 10^{-6}/K$) and RS007 (registered trademark) (PPS resin mixed with a material for thermal conduction, 3.5 W/(m·K), coefficient of thermal expansion: $20 \times 10^{-6}/K$).

FIGS. 8A and 8B are diagrams for explaining a state in which a thermally-conductive material is filled.

As shown in FIG. 8A, it is possible to carry out filling of a thermally-conductive material 140 by, for example, applying the thermally-conductive material 140 on the inner surfaces of the grooves 122 and 132 of the tabular members 12 and 13 and/or the outer surface of the cooling pipe 14 prior to the step of expanding a diameter of the cooling pipe 14. For the application of the thermally-conductive material 140, it is possible to use various methods such as a spin coat method, a spray coat method, a roll coat method, a die coat method, a dip coat method, and a droplet discharging method.

As shown in FIG. 8B, when a diameter of the cooling pipe 14 is expanded after application of the thermally-conductive material 140, the tabular members 12 and 13 and the cooling pipe 14 are thermally connected directly in portions where the grooves 122 and 132 of the tabular members 12 and 13 and the cooling pipe 14 are in contact with each other. The tabular members 12 and 13 and the cooling pipe 14 are thermally connected indirectly via the thermally-conductive material 140 in portions where gaps are formed. In other words, heat transfer between the tabular members 12 and 13 and the cooling pipe 14 is supplemented by the thermally-conductive material 140. Heat transferability between the tabular members 12 and 13 and the cooling pipe 14 is improved. When the thermally-conductive material 140 has an adhesive force, it is also possible to use the force for a connecting for or the like of the tabular members 12 and 13 and the cooling pipe 14.

It is advisable to soften and fluidize the thermally-conductive material 140 as required at the time of the expansion of a diameter of the cooling pipe 14. For example, when the thermally-conductive material 140 is thermoplastic, the thermally-conductive material 140 is heated at the time of the diameter expansion. In this case, it is possible to heat the thermally-conductive material 140 using heat of high-temperature fluid flowing through the cooling pipe 14 at the time of the diameter expansion. Since the thermally-conductive material 140 is softened and fluidized, the thermally-conductive material 140 is filled over an entire area of a gap between the grooves 122 and 132 of the tabular members 12 and 13 and the cooling pipe 14.

When the recesses 125 and 135 are provided adjacent to the grooves 122 and 132, a surplus of the thermally-conductive material 140 is stored in the recesses 125 and 135 (supplementary grooves). Since an escaping place for the thermally-conductive material 140 is provided, the thermally-conductive material 140 tends to spread uniformly. The thermally-conductive material 140 is more surely arranged over the entire area of the gap between the grooves 122 and 132 of the tabular members 12 and 13 and the cooling pipe 14. The thermally-conductive material 140 arranged in the recesses 125 and 135 (or a gap between the opposed surfaces 123 and 133) has a function of improving thermal connectivity of the tabular members 12 and 13.

The thermally-conductive material 140 preferably has elasticity within a range of operating temperature of the cooling plate (the tabular members 12 and 13). Since the thermally-conductive material 140 has elasticity, the thermally-conductive material 140 expands and contracts according to a change in the gap between the tabular members 12 and 13 and the cooling pipe 14 involved in thermal deformation or the like. The thermal connection between the tabular members 12 and 13 and the cooling pipe 14 is stably maintained.

The thermally-conductive material 140 may have fluidity in the range of operating temperature of the cooling plate (the tabular members 12 and 13). In this case, when a volume of the gap between the grooves 122 and 132 of the tabular members 12 and 13 and the cooling pipe 14 changes following thermal deformation, the thermally-conductive material 140 appropriately moves between the gap and the recesses 125 and 135 (the supplementary grooves). Consequently, a filling state of the thermally-conductive material 140 in the gap is kept and the thermal connection between the tabular members 12 and 13 and the cooling pipe 14 is stably maintained. In this case, it is preferable that means for preventing the thermally-conductive material 140 from leaking to the outside is taken. For example, it is also possible that a thermally-conductive material other than an anaerobic material is used and caused to harden the thermally-conductive material in a portion in contact with the external air and keep fluidity in the inside thereof. Alternatively, it is also possible that a thermally-conductive material having fluidity within the range of operation temperature is arranged on an inner side and another thermally-conductive material to be hardened is arranged on an outer side.

FIGS. 9 to 11 are diagrams showing an example in which supplementary grooves 160, in which the thermally conductive-materials 140 are stored at least temporarily, are formed in the inner surfaces of the grooves 122 and 132 of the tabular members 12 and 13 or the opposed surfaces 123 and 133.

In an example in FIG. 9, the supplementary grooves 160 are formed substantially parallel to the grooves 122 and 132 on both the outer sides of the grooves 122 and 132 in the opposed surfaces 123 and 133 of the tabular members 12 and 13. Moreover, the plural supplementary grooves 160 are disposed apart from one another. A shape and the number of the supplementary grooves 160 are appropriately decided according to a material, a characteristic, and the like of the thermally-conductive material 140. It is possible to form even the tabular members 12 and 13 having such a shape easily and at low cost by using the casting method (the die cast method, etc.) or the forging method (the cold/hot forging, etc.).

In the example in FIG. 9, since the supplementary grooves 160 are formed in the opposed surfaces 123 and 133 of the tabular members 12 and 13, the thermally-conductive material 140 tends to spread to the gap between the opposed surfaces 123 and 133. According to the enlargement of an arrangement area of the thermally-conductive material 140, heat transferability between the tabular members 12 and 13 is improved and bonding strength of the tabular members 12 and 13 by the thermally-conductive material 140 is improved.

In an example in FIG. 10, the supplementary grooves 160 are formed in the inner surfaces of the grooves 122 and 132 of the tabular members 12 and 13 to extend in an axial direction of the grooves 122 and 132. Moreover, the plural supplementary grooves 160 are disposed apart from one another in a peripheral direction of the supplementary grooves 160.

In an example in FIG. 11, the supplementary grooves 160 are formed in the inner surfaces of the grooves 122 and 132 of the tabular members 12 and 13 to extend in a peripheral direction of the grooves 122 and 132. Moreover, the plural grooves 160 are disposed apart from one another in the axial direction of the grooves 122 and 132. Note that, in FIG. 11, the supplementary grooves 160 may be formed such that depth thereof changes to be smaller from a bottom to a top of the groove 122 (132).

In the examples in FIGS. 10 and 11, since the supplementary grooves 160 are formed in the inner surfaces of the grooves 122 and 132 of the tabular members 12 and 13, a surplus of the thermally-conductive material 140 easily moves to the supplementary grooves 160 at the time of filling of the thermally-conductive material 140. As a result, the thermally-conductive material 140 tends to spread uniformly. The thermally-conductive material 140 is more surely arranged over the entire area of the gap between the grooves 122 and 132 of the tabular members 12 and 13 and the cooling pipe 14.

The supplementary grooves 160 may be provided in both the grooves 122 and 132 of the tabular members 12 and 13 and the opposed surfaces 123 and 133.

Positioning of an Optical Element

Figure 12A:
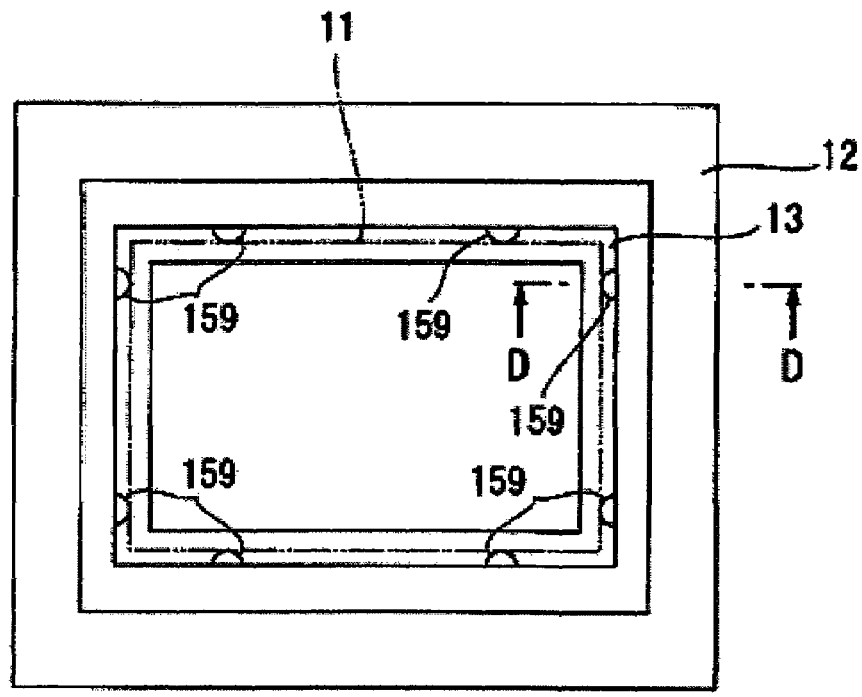
FIG. 12A is a schematic plan view showing a modification of a cooling unit.
Figure 12B:
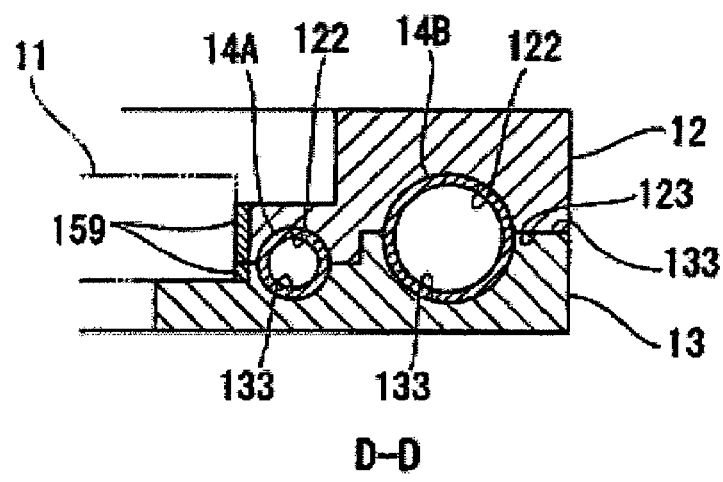
FIG. 12B is a sectional view along line D-D in FIG. 12A.

FIG. 12A is a schematic plan view of a modification of the cooling unit 10 and FIG. 12B is a sectional view along D-D in FIG. 12A. Note that components having functions identical with those already explained are denoted by the identical reference numerals and explanations of the components are omitted or simplified.

In an example in FIGS. 12A and 12B, as in the cooling unit 10 in FIG. 1, the pair of tabular members 12 and 13 hold the peripheral edge of the optical element 11. The cooling pipes 14 are sandwiched by the pair of tabular members 12 and 13.

In this example, the cooling pipes 14 are disposed doubly with respect to a width direction of the optical element 11. A small-diameter pipe 14A is arranged on the opening side of the tabular members 12 and 13 and a large-diameter pipe 14B is arranged on an outer side off the small-diameter pipe 14A.

Plural positioning sections 159 (eight in this example) are provided on sides of the openings of the tabular members 12 and 13 to project from the sides. A tip surface of each of the positioning sections 159 is set in a desired shape by plastic deformation described later. Since the positioning sections 159 of a protrusion shape are provided, surface accuracy of the sides of the openings may be relatively low.

The optical element 11 is positioned in a two-dimensional relative position with respect to the tabular members 12 and 13 by the plural positioning sections 159.

Figure 13A:
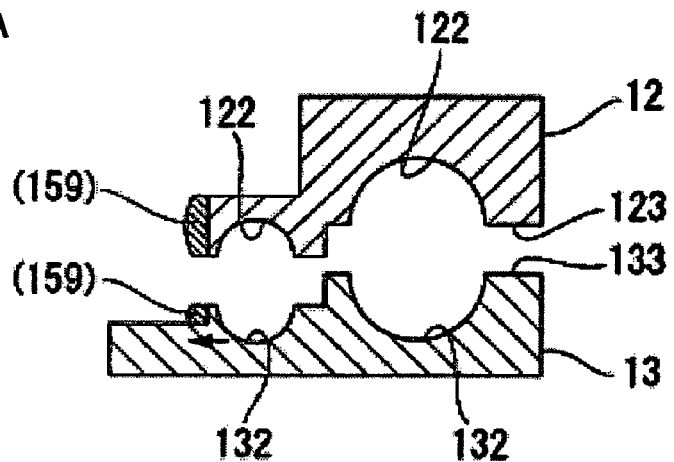
FIGS. 13A to 13C are diagrams for explaining a state in which a shape of a positioning section is set.
Figure 13B:
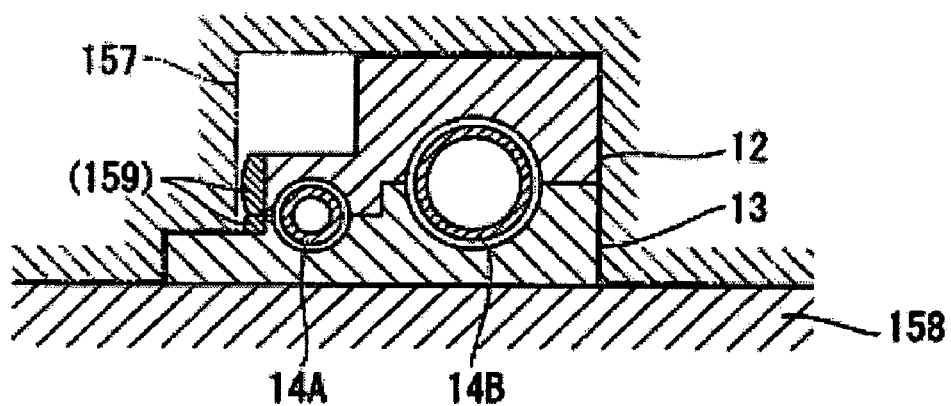
Figure 13C:
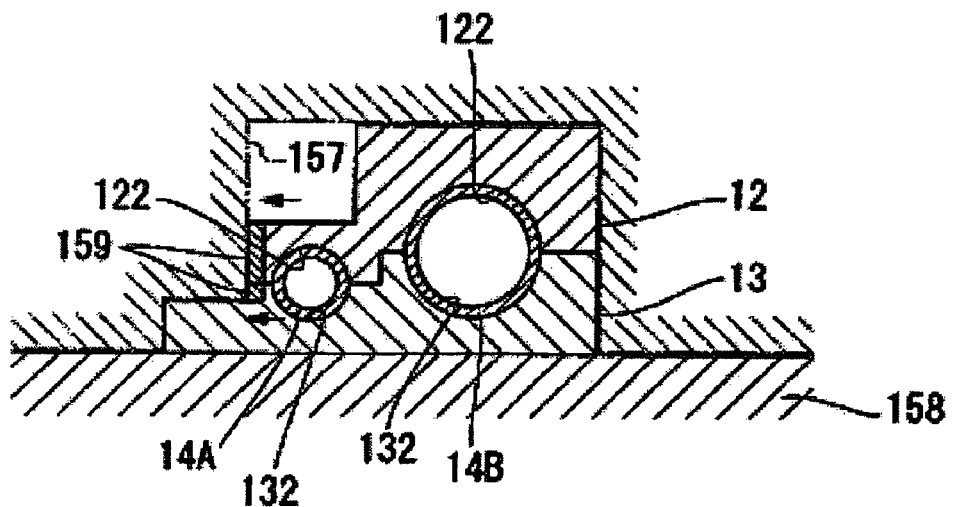

FIGS. 13A to 13C are diagrams for explaining a state in which a shape of the positioning sections 159 in FIG. 12 is set.

In this example, shape setting for the positioning sections 159 is performed making use of deformation of the tabular members 12 and 13 involved in diameter expansion of the cooling pipe 14.

First, the tabular members 12 and 13 including the grooves 122 and 132 for housing the cooling pipe 14 and protrusions to be formed as the positioning sections 159 are prepared (FIG. 13A). At this point, it is desirable that tips of the protrusions (the positioning sections 159) are formed of, for example, a curved surface or a spherical surface. Shape accuracy thereof may be relatively low. It is possible to form even the tabular members 12 and 13 having such a shape easily and at low cost by using the casting method (the die cast method, etc.) or the forging method (the cold/hot forging, etc.). It is possible to preferably apply the casting method or the forging method to a small object as well.

The tabular members 12 and 13 are arranged to be opposed to each other in a state in which the cooling pipes 14 (14A and 14B) are held in the grooves 122 and 132. The opposed surfaces 123 and 133 are kept in a state in which the opposed surfaces 123 and 133 are in abutment against each other (FIG. 13B). At this point, positions of outer sides of the tabular members 12 and 13 are fixed by a die 158 (an outer die) and another die 157 (an inner die) is arranged in the openings of the tabular members 12 and 13. A distance between surfaces of the outer die 158 and the inner die 157 is set to a predetermined distance.

Diameters of the cooling pipes 14 (14A and 14B) are expanded (FIG. 13C). The diameter expansion is performed by compressing and supplying fluid into the cooling pipes 14A and 14B and repeatedly performed for plural number of times as required. According to the diameter expansion of the cooling pipes 14, outer surfaces of the cooling pipes 14 are brought into close contact with the grooves 122 and 132 of the tabular members 12 and 13 and portions between the cooling pipe 14A and the openings, which are thin portions of the tabular members 12 and 13, are deformed outward. The tips of the protrusions (the positioning sections 159) are pressed to be brought into contact with the inner die 157 and plastically deformed following the deformation of the thin portions. The shape setting for the positioning sections 159 are performed according to the plastic deformation. In other words, two-dimensional relative positions of the tip surfaces of the positioning sections 159 with respect to reference surfaces (outer surfaces of the tabular members 12 and 13) are set on the basis of the distance between the surfaces of the outer die 158 and the inner die 157.

In this way, in this example, the shape setting for the positioning sections 159 for positioning the optical element 11 is performed according to the plastic deformation making use of the diameter expansion of the cooling pipe 14. Thus, a process is simplified compared with the time when the shape setting for the positioning sections 159 is performed by cutting.

Figure 14:
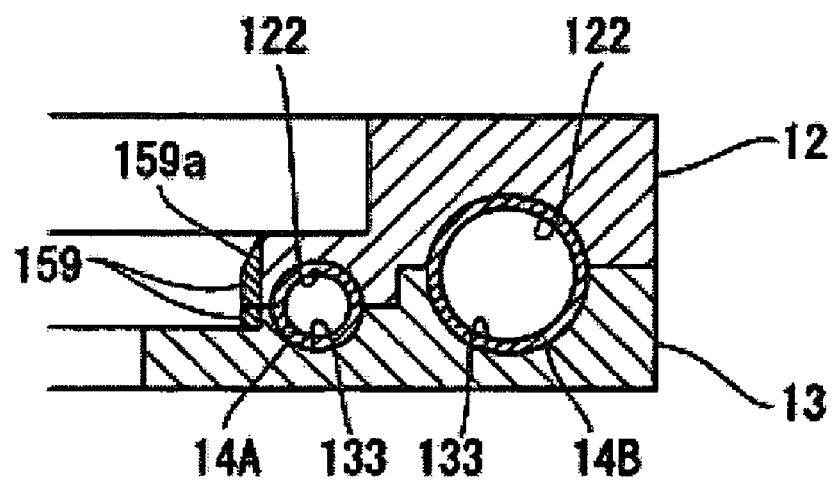
FIG. 14 is a diagram showing an example in which a slope for guiding an optical element is formed in the positioning section.

As shown in FIG. 14, a slope 159*a* for guiding the optical element 11 to the positioning section 159 may be formed. In this case, an inclined plane corresponding to the slope 159*a* is provided in the inner die 157 (see FIG. 13). It is possible to easily set the positioning sections 159 in various shapes according to the plastic deformation using the dies.

The cooling unit and the manufacturing method therefor according to the aspects of the invention explained above are preferably applied to various optical devices that require cooling of an optical element. It is possible to realize a reduction in cost and a reduction in size of the optical devices according to the application of the cooling unit and the manufacturing method.

Constitution of a Projector

As an example of the application of the cooling unit, an embodiment of a projector will be hereinafter explained with reference to the drawings. In the example explained below, it is possible to apply the cooling unit 10 and the manufacturing-method therefor to a liquid cooling unit 46 (see FIG. 15) described later.

In this case, the optical element 11 (see FIG. 1) is applied to at least one of liquid crystal panels 441R, 441G, and 441B, incidence side sheet polarizers 442, and emission side sheet polarizers 443 described later (see FIG. 18).

Similarly, the tabular members 12 and 13 are applied to at least one of a liquid crystal panel holding frame 445 (a frame-like member 4451 and a frame-like member 4452), an incidence side sheet polarizer holding frame 446 (a frame-like member 4461 and a frame-like member 4462), and an emission side sheet polarizer holding frame 447 (a frame-like member 4471 and a frame-like member 4472) described later.

Similarly, the cooling pipe 14 is applied to element cooling pipes 463 (a liquid crystal panel cooling pipe 4631R, an incidence side sheet polarizer cooling pipe 4632R, and an emission side sheet polarizer cooling pipe 4633R) described later.

It is possible to realize a reduction in cost and a reduction in size of the projector by applying the cooling unit and the manufacturing method therefor to the liquid cooling unit 46 described later. Moreover, it is possible to extend a durable life due to improvement of cooling performance.

Figure 15:
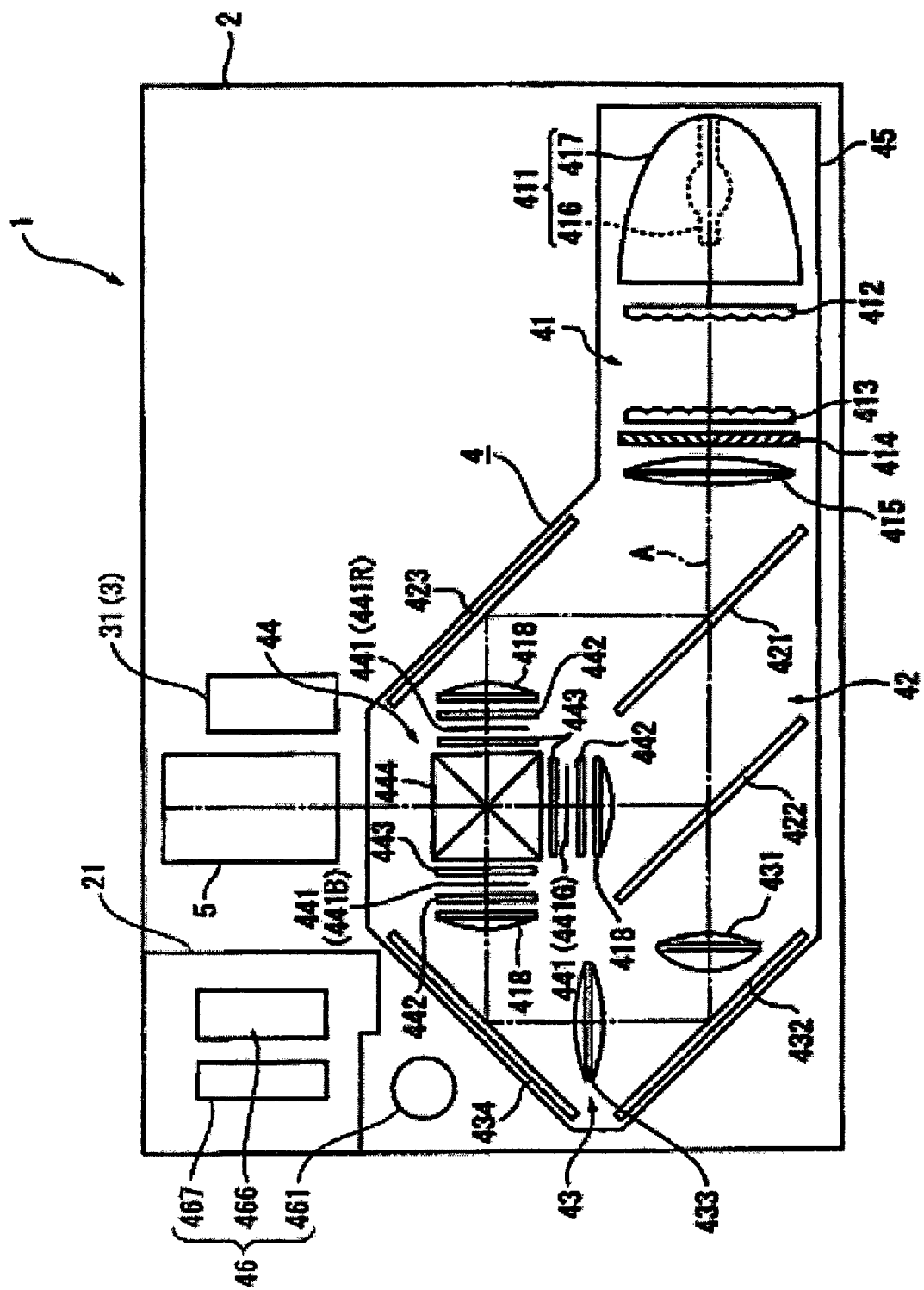
FIG. 15 is a diagram showing a schematic constitution of a projector.

FIG. 15 is a diagram showing a schematic constitution of a projector 1.

The projector 1 modulates a light beam emitted from a light source according to image information to form an optical image and magnifies and projects the formed optical image on a screen. The projector 1 includes an armor case 2, an air cooling device 3, an optical unit 4, and an projection lens 5 serving as a projection optical device.

In FIG. 15, although not shown in the figure, a power supply block, a lamp driving circuit, and the like are arranged in a space other than the air cooling device 3, the optical unit 4, and the projection lens 5 in the armor case 2.

The armor case 2 is made of synthetic resin or the like and is formed in a substantially rectangular parallelepiped shape as a whole in which the air cooling device 3, the optical unit 4, and the projection lens 5 are arranged to be housed. Although not shown in the figure, the armor case 2 includes an upper case that constitutes a top surface, a front surface, a rear surface, and side surfaces of the projector 1 and a lower case that constitutes a bottom surface, the front surface, the side surfaces, and the rear surface of the projector 1. The upper case and the lower case are fixed to each other by screws.

The armor case 2 may be formed of materials other than synthetic resin or the like. For example, the armor case 2 may be formed of metal or the like.

Although not shown in the figure, an intake port (e.g., an intake port 22 shown in FIG. 16) for leading the air from the outside to the inside of the projector 1 and an exhaust port for discharging the air warmed in the projector 1.

Moreover, as shown in FIG. 15, a partition wall 21 is formed in the armor case 2. The partition wall 21 is located in a lateral direction of the projection lens 5 and in a corner part of the armor case 2 and separates a radiator 466, an axial flow fan 467, and the like described later of the optical unit 4 from other members.

The air cooling device 3 feeds a cooling air into a cooling flow path formed inside the projector 1 and cools the projector 1. The cooling device 3 is located in a lateral direction of the projection lens 5 and includes a sirocco fan 31 that leads a cooling air in the outside of the projector 1 to the inside of the projector 1 from the not-shown intake port formed in the armor case 2. The cooling device 3 also includes a cooling fan or the like for cooling the power supply block, the lamp driving circuit, and the like that are not shown in the figure.

The optical unit 4 is a unit that optically processes a light beam emitted from the light source and forms an optical image (a color image) according to image information. As an overall shape of the optical unit 4, as shown in FIG. 15, the optical unit 4 has a substantially L shape in a plan view extending generally along the rear surface of the armor case 2 and extending along the side surfaces of the armor case 2. Note that a detailed constitution of the optical unit 4 is described later.

The projection lens 5 is constituted as a set lens in which plural lenses are combined. The projection lens 5 magnifies and projects the optical image (the color image) formed by the optical unit 4 on a not-shown screen.

Detailed Constitution of an Optical Unit

As shown in FIG. 15, the optical unit 4 includes an integrator lighting optical system 41, a color separation optical system 42, a relay optical system 43, an optical device 44, an optical component housing 45, and the liquid cooling unit 46.

The integrator lighting optical system 41 is an optical system for substantially uniformly lighting image formation areas of liquid crystal panels described later constituting the optical device 44. As shown in FIG. 15, the integrator lighting optical system 41 includes a light source unit 411, a first lens array 412, a second lens array 413, a polarization conversion element 414, and a superimposing lens 415.

The light source unit 411 includes a light source lamp 416 that emits light radially and a reflector 417 that reflects radial light emitted from the light source lamp 416. A halogen lamp, a metal halide lamp, and a high-pressure mercury lamp are often used as the light source lamp 416. In FIG. 15, a radiating surface mirror is adopted as the reflector 417. However, the reflector 417 is not limited to this and may be constituted by an ellipsoid mirror. A collimating concave lens that changes a light beam reflected by the ellipsoid mirror to parallel light may be adopted on a light beam emission side.

The first lens array 412 has a constitution in which small lenses having a substantially rectangular outline viewed from an optical axis direction are arranged in a matrix shape. The respective small lenses divide a light beam emitted from the light source unit 411 into plural partial light beams.

The second lens array 413 has substantially the same constitution as the first lens array 412, that is, the constitution in which small lenses are arranged in a matrix shape. The second lens array 413 has a function of focusing images of the respective small lenses of the first lens array 412 on the liquid crystal panels described later of the optical device 44 in conjunction with the superimposing lens 415.

The polarization conversion element 414 is arranged between the second lens array 413 and the superimposing lens 415 and converts light from the second lens array 413 into substantially one kind of polarized light.

Specifically, most of respective partial lights converted into substantially one kind of polarized light by the polarization conversion element 414 are finally superimposed on the liquid crystal panels described later of the optically device 44 by the superimposing lens 415. In a projector using a liquid crystal panel of a type for modulating polarized light, since only one kind of polarized light can be used, it is impossible to use substantially a half of light from the light source unit 411 emitting random polarized light. Therefore, emitted light from the light source 411 is converted into substantially one kind of polarized light to improve efficiency of use of light in the optical device 44 by using the polarization conversion element 414.

As shown in FIG. 15, the color separation optical system 42 includes two dichroic mirrors 421 and 422 and a reflection mirror 423. The color separation optical system 42 has a function of separating plural partial light beams emitted from the integrator lighting optical system 41 into color lights of three colors, red (R), green (G), and blue (B), with the dichroic mirrors 421 and 422.

As shown in FIG. 15, the relay optical system 43 includes an incidence side lens 431, a relay lens 433, and reflection mirrors 432 and 434. The relay optical system 43 has a function of guiding the blue light separated by the color separation optical system 42 to a liquid crystal panel for blue light described later of the optical device 44.

In this case, the dichroic mirror 421 of the color separation optical system 42 reflects a red light component of the light beam emitted from the integrator lighting optical system 41 and transmits a green light component and a blue light component of the light beam. The red light reflected by the dichroic mirror 421 is reflected by the reflection mirror 423 and reaches a liquid crystal panel for red light described later of the optical device 44 through a field lens 418. The field lens 418 converts the respective partial light beams emitted from the second lens array 413 into light beams parallel to a center axis (a main beam) of the field lens 418. The field lenses 418 provided on light incidence sides of other liquid crystal panels for green light and blue light function in the same manner.

The green light of the green light and the blue light transmitted through the dichroic mirror 421 is reflected by the dichroic mirror 422 and reaches the liquid crystal panel for green light described later of the optical device 44 through the field lens 418. On the other hand, the blue light is transmitted through the dichroic mirror 422 and reaches the liquid crystal panel for blue light described later of the optical device 44 through the relay optical system 43 and through the field lens 418. The relay optical system 43 is used for the blue light in order to prevent a fall in efficiency of use of light due to divergence or the like of light because an optical path of the blue light is longer than optical paths of the other color lights. In other word, such a constitution is adopted because an optical path of partial color light made incident on the incidence side lens 431 is long. However, it is conceivable to adopt a constitution in which an optical path of the red light is set longer.

As shown in FIG. 15, the optical device 44 is an optical device in which three liquid crystal panels 441 (a liquid crystal panel for red light is denoted by 441R, a liquid crystal panel for green light is denoted by 441G, and a liquid crystal panel for blue light is denoted by 441B) serving as light modulating elements, three incidence side sheet polarizers 442 and three emission side sheet polarizers 443 serving as optical conversion elements arranged on light beam incidence sides and light beam emission sides of the liquid crystal panels 441, and a cross dichroic prism 444 serving as a color combining optical system are integrally constituted.

Although not shown in the figure, the liquid crystal panels 441 have a constitution in which liquid crystal, which is an electro-optical substance, is sealed between a pair of transparent glass substrates. An orientation state of the liquid crystal is controlled according to a driving signal outputted from a not-shown control device. Consequently, the liquid crystal panels 441 modulate polarizing directions of polarized light beams emitted from the incidence side sheet polarizers 442.

The respective color lights with polarizing directions aligned substantially in one direction by the polarization conversion element 414 are made incident on the incidence side sheet polarizers 442. The incidence side sheet polarizers 442 transmit only polarized lights in a direction substantially identical with a polarization axis of light beams aligned by the polarization conversion element 414 among the light beams made incident thereon. The incidence side sheet polarizers 442 absorb the other light beams (light absorption type).

Although not specifically shown in the figure, the incidence side sheet polarizers 442 have a constitution in which a polarizing film is stuck on a translucent substrate such as sapphire glass or quartz. The polarizing film of the light absorption type is formed by, for example, uniaxially extending a film containing iodine molecules or dye molecules. The polarizing film has an advantage that an extinction ratio is relatively high and incidence angle dependency is relatively small.

The emission side sheet polarizers 443 have substantially the same constitution as the incidence side sheet polarizers 442. The emission side sheet polarizers 443 transmit only light beams having polarization axes orthogonal to a transmission axis of light beams in the incidence side sheet polarizers 442 among the light beams emitted from the liquid crystal panels 441. The emission side sheet polarizers 443 absorb the other light beams (light absorption type).

The cross dichroic prism 444 is an optical element that combines optical images modulated for each of the color lights emitted from the emission side sheet polarizers 443 to form a color image. The cross dichroic prism 444 is formed in substantially a regular square shape in a plan view obtained by sticking four right angle prisms together. Two dielectric multilayer films are formed on interfaces where the right angle prisms are stuck together. The dielectric multilayer films reflect the color lights emitted from the liquid crystal panels 441R and 441B and transmitted through the emission side sheet polarizers 443. The dielectric multilayer films transmit the color light emitted from the liquid crystal panel 441G and transmitted through the emission side sheet polarizer 443. In this way, the respective color lights modulated by the respective liquid crystal panels 441R, 441G, and 441B are combined to form a color image.

The optical component housing 45 is made of, for example, a metal member. A predetermined lighting optical axis A is set in the optical component housing 45. The optical components 41 to 44 are arranged to be housed in predetermined positions with respect to the lighting optical axis A in the optical component housing 45. The optical component housing 45 may be made of materials other than the metal member and, in particular, made of a thermally-conductive material.

The liquid cooling unit 46 circulates a cooling fluid to mainly cool the optical device 44. The liquid cooling unit 46 includes a fluid compressing unit, an element cooling pipe, a branching tank, a merging tank, a pike section, and the like, which are described later, other than a main tank 461 that temporarily stores the cooling fluid, the radiator 466 serving as a heat radiating unit for radiating heat of the cooling fluid, and the axial flow fan 467 that blows a cooling air to the radiator 466.

Figure 16:
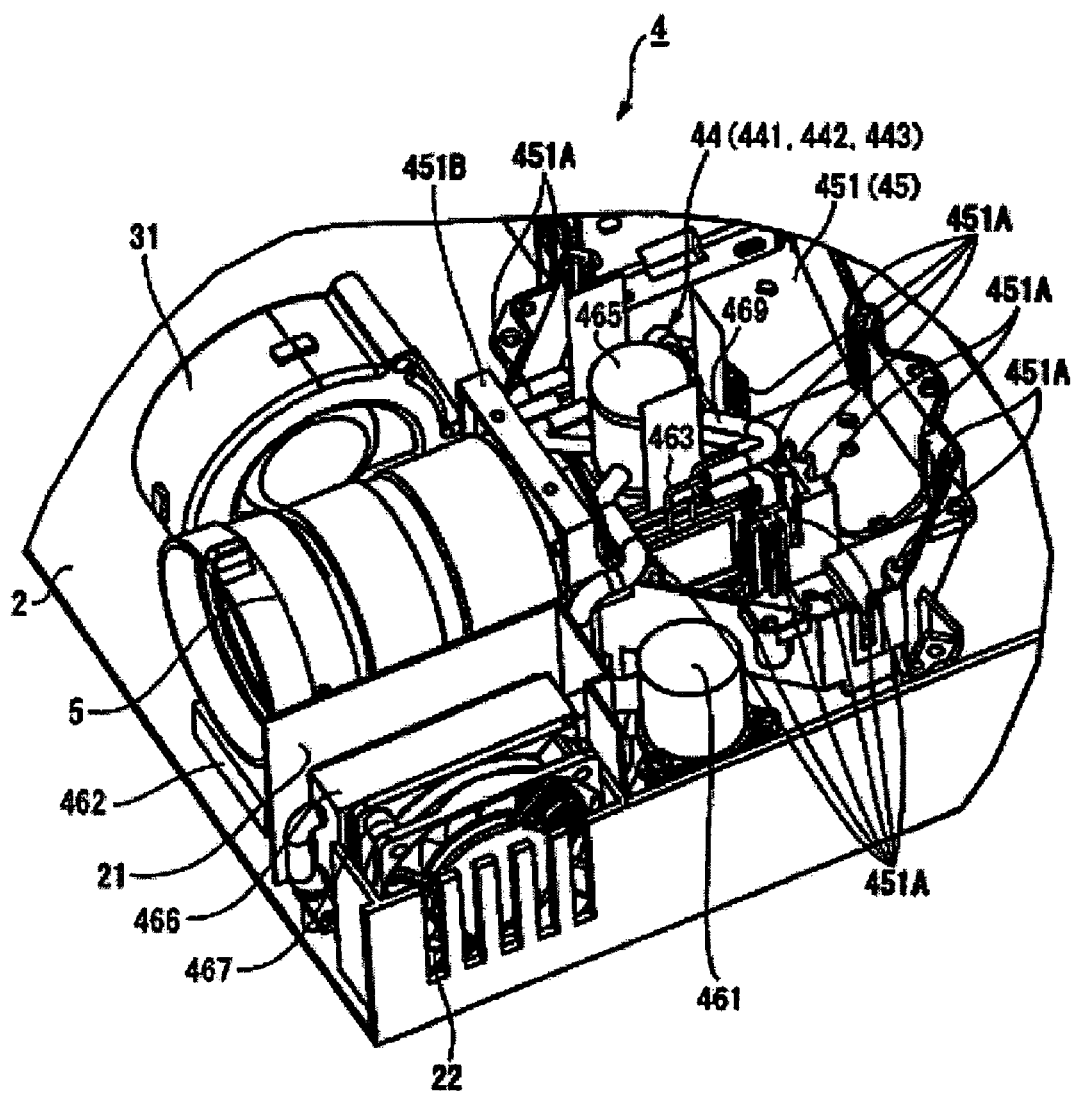
FIG. 16 is a perspective view of a part of the inside of the projector viewed from above.

FIG. 16 is a perspective view of a part of the inside of the projector 1 viewed from an upper side. FIG. 17 is a perspective view of mainly the optical device 44 and the liquid cooling unit 46 in the projector 1 viewed from below.

In FIG. 16, for simplification of an explanation, only the optical device 44 is shown among the optical components in the optical component housing 45. The other optical components 41 to 43 are not shown in the figure. In addition, in FIGS. 16 and 17, for simplification of an explanation, a part of the members in the liquid cooling unit 46 are not shown.

As shown in FIG. 16, the optical component housing 45 includes a component housing member 451 and a not-shown lid-like member that closes an opening portion of the component housing member 451.

The component housing member 451 constitutes a bottom surface, a front surface, and side surfaces of the optical component housing 45.

In the component housing member 451, as shown in FIG. 16, grooves 451A for fitting in the optical components 41 to 44 from above in a sliding manner are formed on inner side surfaces of the side surfaces.

As shown in FIG. 16, a projection lens setting unit 451B for setting the projection lens 5 in a predetermined position with respect to the optical unit 4 is formed in a front portion of the side surfaces. The projection lens setting unit 451B is formed in substantially a rectangular shape in a plan view. A not-shown circular hole is formed in substantially the center in a plan view in association with a light beam emitting position where light beams are emitted from the optical device 44. A color image formed by the optical unit 4 is magnified and projected by the projection lens 5 through the hole.

Liquid Cooling Unit

The liquid cooling unit 46 will be hereinafter explained in detail.

In FIGS. 16 and 17, the liquid cooling unit 46 includes the main tank 461, a fluid compressing unit 462 (FIG. 17), the element cooling pipes 463, a branching tank 464 (FIG. 17), the merging tank 465, the radiator 466, the axial flow fan 467, pipe sections 469, and the like.

As shown in FIGS. 16 and 17, the main tank 461 has substantially a cylindrical shape as a whole and includes two container-like members made of metal such as aluminum. Opening portions of the two container-like members are connected to each other to temporarily store the cooling fluid in the main tank 461. The container-like members are connected by, for example, seal welding or intervention of an elastic member such as rubber.

As shown in FIG. 17, an inlet section 461A and an outlet portion 461B for the cooling fluid is formed in a peripheral surface of the main tank 461.

The inlet section 461A and the outlet section 461B are made of a tubular member and arranged to project to the inside and the outside of the main tank 461. One end of the pipe section 469 is connected to one end of the inlet section 461A projecting to the outside. The cooling fluid from the outside flows into the main tank 461 through the pipe section 469. One end of the pipe section 469 is also connected to one end of the outlet section 461B projecting to the outside. The cooling fluid in the main tank 461 flows out to the outside through the pipe section 469.

In the main tank 461, the inlet section 461A and the outlet section 461B are in a positional relation in which respective center axes thereof are substantially orthogonal to each other. Consequently, the cooling fluid flowing into the main tank 461 through the inlet section 461A is prevented from immediately flowing out to the outside through the outlet section 461B. The cooling fluid is homogenized and temperature of the cooling fluid is uniformalized by a mixing action in the main tank 461. The cooling fluid flowing out from the main tank 461 is sent to the fluid compressing unit 462 through the pipe sections 469.

As shown in FIG. 17, the fluid compressing unit 462 sucks the cooling fluid sent from the main tank 461 and forcibly discharges the cooling fluid to the outside toward the branching tank 464. The outlet section 461B of the main tank 461 and an inlet section 462A of the fluid compressing unit 462 are connected via the pipe sections 469. The outlet section 462B of the fluid compressing unit 462 and an inlet section 464A of the branching tank 464 are connected via the pipe sections 469.

Specifically, the fluid compressing unit 462 has, for example, a constitution in which an impeller is arranged in a hollow member of a substantially rectangular parallelepiped shape made of metal such as aluminum. The impeller rotates under the control of the not-shown control device, whereby the fluid compressing unit 462 forcibly sucks the cooling fluid stored in the main tank 461 through the pipe sections 469 and forcibly discharges the cooling fluid to the outside through the pipe sections 469. With such a constitution, it is possible to reduce thickness in a rotation axis direction of the impeller to realize a reduction in size of the cooling unit 46 and a reduction in space for the cooling unit 46. In this embodiment, as shown in FIG. 16 or in FIG. 17, the fluid compressing unit 462 is arranged below the projection lens 5.

The element cooling pipes 463 are disposed to be adjacent to the elements, that is, the liquid crystal panels 441, the incidence side sheet polarizers 442, and the emission side sheet polarizers 443, in the optical device 44. Heat exchange is performed between the cooling fluid flowing through the element cooling pipes 463 and the respective elements 441, 442, and 443.

Figure 18:
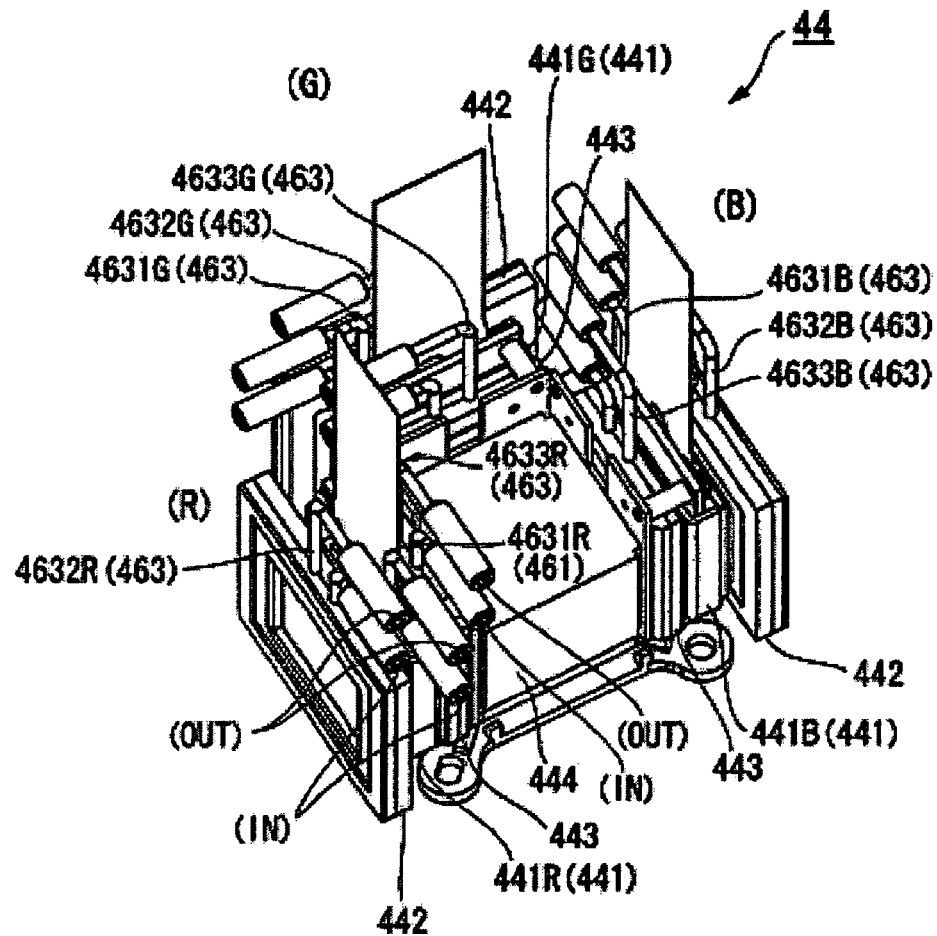
FIG. 18 is a perspective view showing an overall constitution of the optical device.

FIG. 18 is a perspective view showing an overall constitution of the optical device 44.

In FIG. 18, as described above, the optical device 44 is an optical device in which the three liquid crystal panels 441 (the liquid crystal panel for red light 441R, the liquid crystal panel for green light 441G, and the liquid crystal panel for blue light 441B), the sheet polarizers (the incidence side sheet polarizers 442 and the emission side sheet polarizers 443) arranged on the incidence sides and the emission sides of the respective liquid crystal panels 441, and the cross dichroic prism 444 are integrally constituted.

The emission side sheet polarizers 443, the liquid crystal panels 441, and the incidence side sheet polarizers 442 are arranged to be laid one on top of another in this order on the cross dichroic prism 444 for each of the colors, red (R), green (G), and blue (B).

The element cooling pipes 463 are disposed separately for the liquid crystal panels 441, the incidence side sheet polarizers 442, and the emission side sheet polarizers 443.

Specifically, for red light, the element cooling pipes 463 include a liquid crystal panel cooling pipe 4631R disposed at a peripheral edge of the liquid crystal panel 441R, an incidence side sheet polarizer cooling pipe 4632R disposed at a peripheral edge of the incidence side sheet polarizer 442, and an emission side sheet polarizer cooling pipe 4633R disposed at a peripheral edge of the emission side sheet polarizer 443. The cooling fluid flows into the respective element cooling pipes 4631R, 4632R, and 4633R from inlet sections (IN) thereof, flow along the peripheral edges of the respective elements 441R, 442, and 443, and flows out to the outside from outlet sections (OUT) of the respective pipes.

Similarly, for green light, the element cooling pipes 463 include a liquid crystal panel cooling pipe 4631G disposed at a peripheral edge of the liquid crystal panel 441G, an incidence side sheet polarizer cooling pipe 4632G disposed at a peripheral edge of the incidence side sheet polarizer 442, and an emission side sheet polarizer cooling pipe 4633G disposed at a peripheral edge of the emission side sheet polarizer 443. For blue light, the element cooling pipes 463 include a liquid crystal panel cooling pipe 4631B disposed at a peripheral edge of the liquid crystal panel 441B, an incidence side sheet polarizer cooling pipe 4632B disposed at a peripheral edge of the incidence side sheet polarizer 442, and an emission side sheet polarizer cooling pipe 4633B disposed at a peripheral edge of the emission side sheet polarizer 443.

In this embodiment, the peripheral edges of the respective elements, that is, the liquid crystal panels 441, the incidence side sheet polarizers 442, and the emission side sheet polarizers 443, are held in holding frames. In the holding frames, the respective element cooling pipes 463 are disposed around substantially the entire peripheral edges of the respective elements along the peripheral edges. The inlet sections (IN) and the outlet sections (OUT) of the respective element cooling pipes 463 are disposed on identical sides of the respective elements 441, 442, and 443.

Note that detailed structures of the element holding frames and the element cooling pipes 463 will be described later.

Referring back to FIGS. 16 and 17, as shown in FIG. 17, the branching tank 464 is a tank that branches the cooling fluid sent from the fluid compressing unit 462 toward the respective element cooling pipes 463.

As shown in FIG. 16, the merging tank 465 is a tank that merges cooling fluids sent from the respective element cooling pipes 463 and temporarily stores the cooling fluids.

In this embodiment, the branching tank 464 is disposed on one surface of the cross dichroic prism 444 in the optical device 44. The merging tank 465 is arranged on one surface on the opposite side of the cross dichroic prism 444. Arrangement positions of the branching tank 464 and the merging tank 465 are not limited to these positions and may be other positions.

Figure 19:
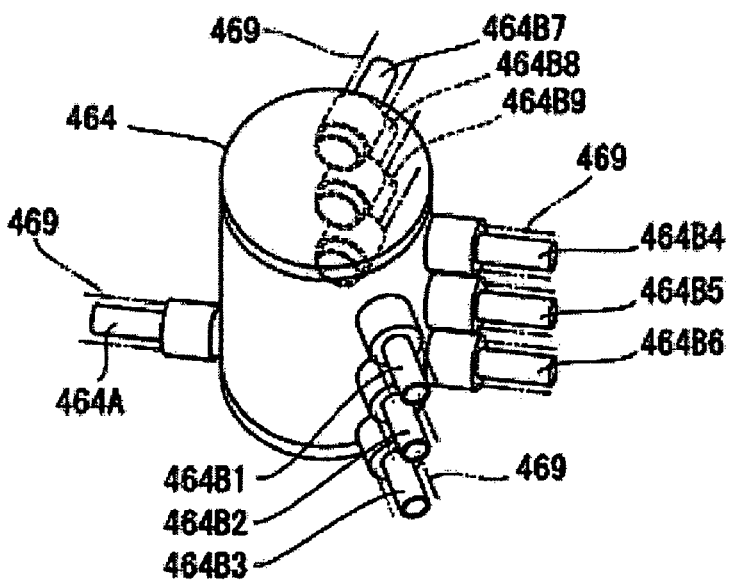
FIG. 19 is a perspective view showing an overall constitution of a branch tank.
Figure 20:
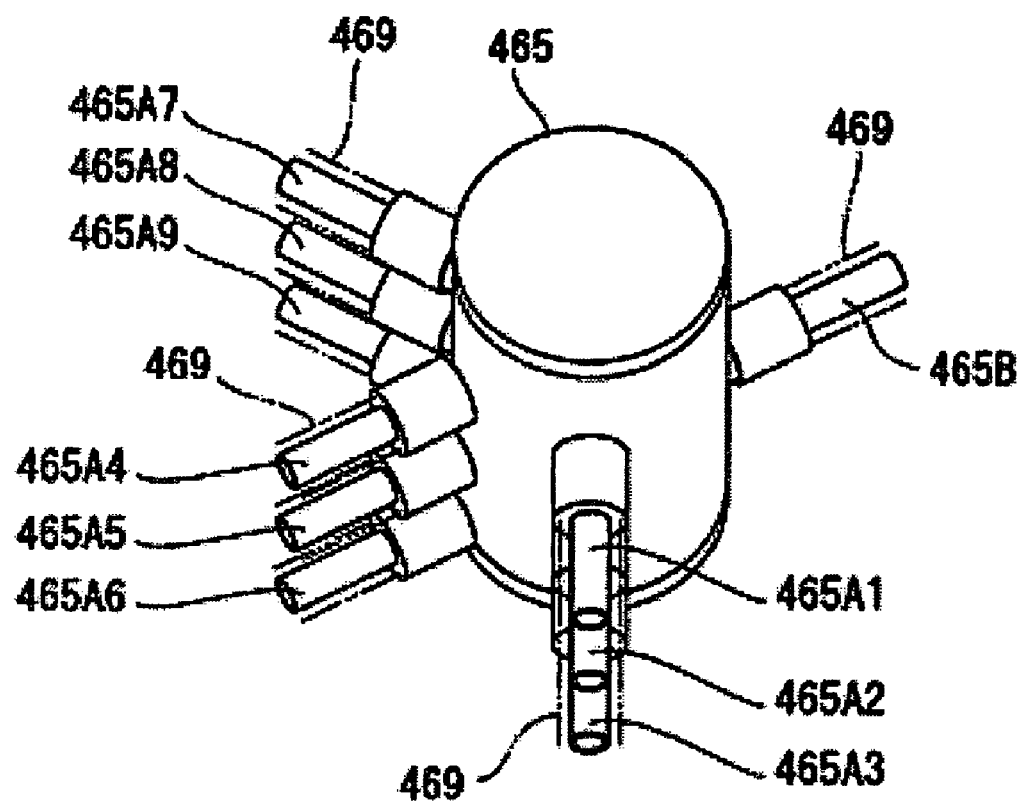
FIG. 20 is a perspective view showing an overall constitution of a merging tank.

FIG. 19 is a perspective view showing an overall constitution of the branching tank 464. FIG. 20 is a perspective view showing an overall constitution of the merging tank 465.

As shown in FIG. 19, the branching tank 464 has a substantially cylindrical shape as a whole. The branching tank 464 is made of a sealed container-like member made of metal such as aluminum and temporarily stores the cooling fluid in the inside thereof.

The inlet section 464A and outlet sections 464B1, 464B2, . . . , 464B9 for the cooling fluid are formed in a peripheral surface of the branching tank 464.

The inlet section 464A and the outlet sections 464B1 to 464B9 are made of a tubular member and arranged to project to the inside and the outside of the branching tank 464. One end of the pipe section 469 is connected to one end of the inlet section 464A projecting to the outside. The cooling fluid from the fluid compressing unit 462 (see FIG. 17) flows into the branching tank 464 through the pipe section 469. One ends of the pipe sections 469 are also separately connected to respective one ends of the outlet sections 464B1 to 464B9 projecting to the outside. The cooling fluid in the branching tank 464 flows out toward the respective element cooling pipes 463 (see FIG. 18) through the pipe sections 469.

As shown in FIG. 20, in the same manner as the branching tank 464, the merging tank 465 has a substantially cylindrical shape as a whole. The merging tank 465 is made of a sealed container-like member made of metal such as aluminum and temporarily stores the cooling fluid in the inside thereof.

Inlet sections 465A1, 465A2, . . . , 465A9 and the outlet section 465B for the cooling fluid are formed in a peripheral surface of the merging tank 465.

The inlet sections 465A1 to 465A9 and the outlet section 465B are made of a tubular member and arranged to project to the inside and the outside of the merging tank 465. One ends of the pipe sections 469 are separately connected to the respective one ends of the inlet sections 465A1 to 465A9 projecting to the outside. The cooling fluids from the respective element cooling pipes 463 (see FIG. 18) flows into the merging tank 465 through the pipe sections 469. One end of the pipe section 469 is also connected to one end of the outlet section 465B projecting to the outside. The cooling fluid in the merging tank 465 flows out toward the radiator 466 through the pipe section 469.

Referring back to FIGS. 16 and 17, as shown in FIG. 17, thee radiator 466 includes a tubular member 4661 through which the cooling fluid flows and plural heat radiation fins 4662 connected to the tubular member 4661.

The tubular member 4661 is made of a member with high thermal conductivity such as aluminum. The cooling fluid flowing in from an inlet section 4661A flows through the tubular member 4661 toward an outlet section 4661B. The inlet section 4661A of the tubular member 4661 and the outlet section 465B of the merging tank 465 are connected via the pipe section 469. The outlet section 4661B of the tubular member 4661 and the main tank 461 is connected via the pipe section 469.

The plural heat radiation fins 4662 are made of a tabular member with high thermal conductivity such as aluminum and arranged in parallel to one another. The axial flow fan 467 is constituted to blow the cooling air from one surface side of the radiator 466.

In the radiator 466, heat of the cooling fluid flowing through the tubular member 4661 is radiated via the heat radiation fins 4662. The heat radiation is facilitated by supply of the cooling air by the axial flow fan 467.

As a material forming the pipe sections 469, for example, metal such as aluminum is used. Other materials such as resin may be used.

As the cooling fluid, for example, ethylene glycol that is a transparent nonvolatile liquid is used. Other liquids may be used. Note that the cooling fluid in the invention is not limited to liquid and may be gas or may be, for example, a mixture of liquid and solid.

As explained above, in the liquid cooling unit 46, the cooling fluid flows in an order of the main tank 461, the fluid compressing unit 462, the branching tank 464, the element cooling pipes 463, the merging tank 465, and the radiator 466 through the pipe sections 469. The cooling fluid returns to the main tank 461 from the radiator 466 and repeatedly flows through the path to circulate.

In the liquid cooling unit 46, since the cooling fluid flows through the respective element cooling pipes 463, heat of the respective elements 441, 442, and 443 in the optical device 44 generated by irradiation of light beams or the like is appropriately removed to control a temperature rise in the respective elements 441, 442, and 443. The heat of the respective elements 441, 442, and 443 is transmitted to the cooling fluid in the respective element cooling pipes 463 via the holding frames of the respective elements.

Element Holding Frames and Element Cooling Pipes

The element holding frames and the element cooling pipes will be explained. Those for red light are explained here as representative one. However, those for green light and blue light are the same.

Figure 21:
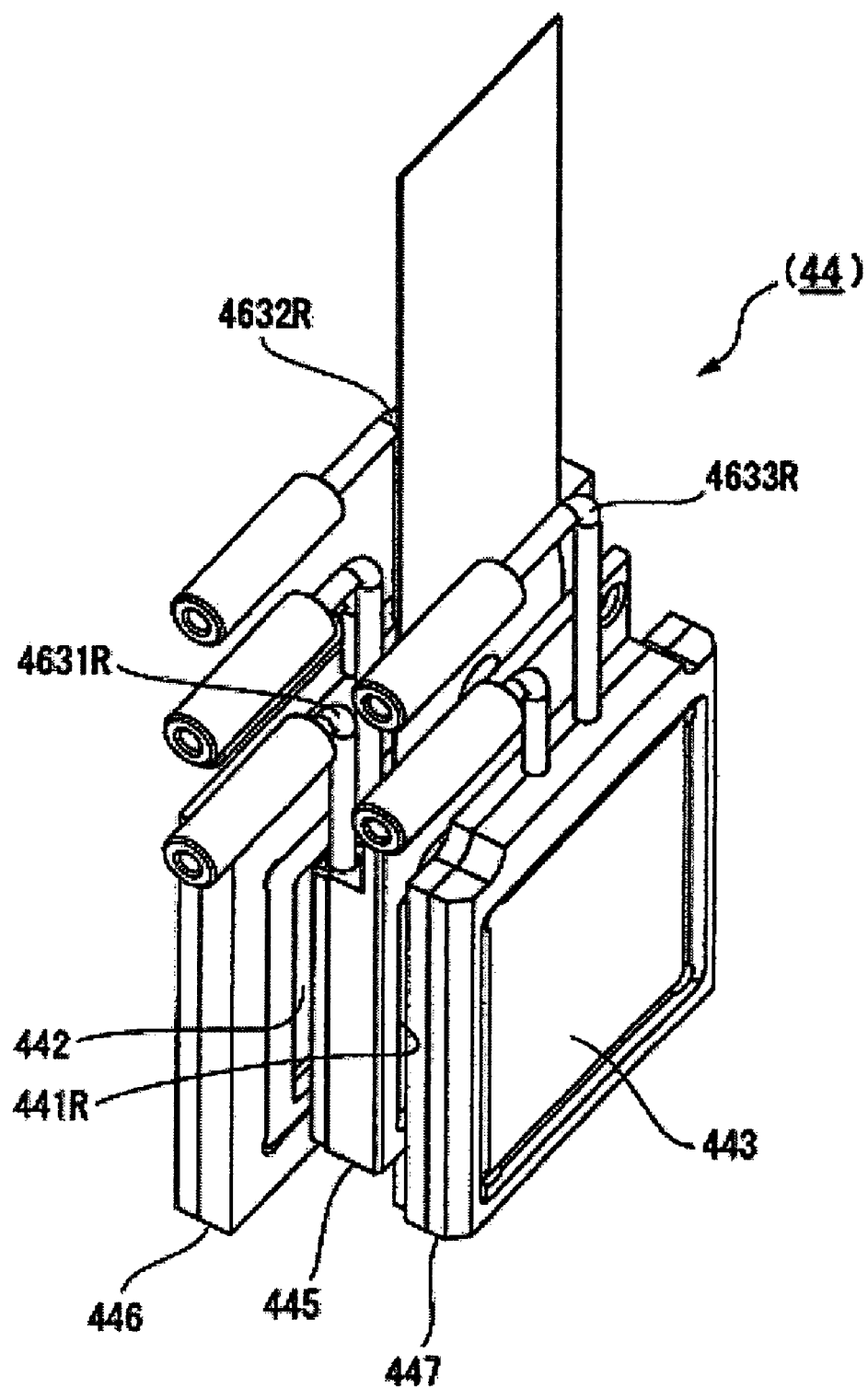
FIG. 21 is a partial perspective view showing a panel constitution for red light in the optical device.

FIG. 21 is a partial perspective view showing a panel constitution for red light in the optical device 44.

As shown in FIG. 21, for red light, the peripheral edge of the liquid crystal panel 441R is held by the liquid crystal panel holding frame 445. The peripheral edge of the incidence side sheet polarizer 442 is held by the incidence side sheet polarizer holding frame 446. The peripheral edge of the emission side sheet polarizer 443 is held by the emission side sheet polarizer holding frame 447. The respective holding frames 445, 446, and 447 have rectangular openings described later corresponding to an image formation area of the liquid crystal panel 441R. Light beams pass through the openings.

The liquid crystal panel cooling pipe 4631R is disposed in the liquid crystal panel holding frame 445 along the peripheral edge of the liquid crystal panel 441R. The incidence side sheet polarizer cooling pipe 4632R is disposed in the incidence side sheet polarizer holding frame 446 along the peripheral edge of the incidence side sheet polarizer 442. The emission side sheet polarizer cooling pipe 4633R is disposed in the emission side sheet polarizer holding frame 447 along the peripheral edge of the emission side sheet polarizer 443.

Figure 22:
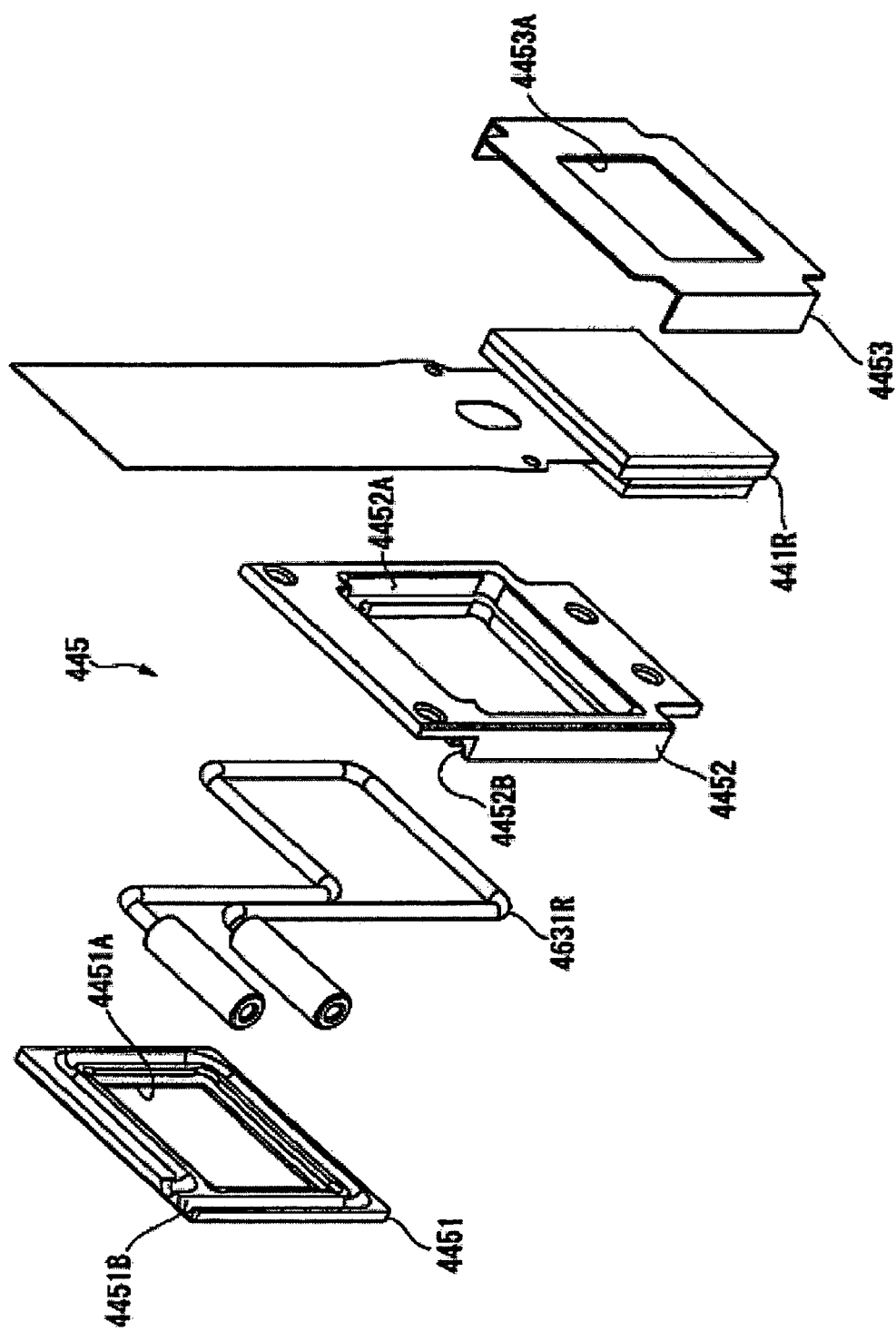
FIG. 22 is a disassembled perspective view of a liquid crystal panel holding frame.

FIG. 22 is a disassembled perspective view of the liquid crystal panel holding frame 445. FIG. 23A is an assembled front view of the liquid crystal panel holding frame 445. FIG. 23B is a sectional view along A-A in FIG. 23A.

As shown in FIG. 23, the liquid crystal panel holding frame 445 includes the pair of frame-like members 4451 and 4452 and a liquid crystal panel fixing plate 4453.

The liquid crystal panel 441R is a transmission type and has a constitution in which a liquid crystal layer is sealed between a pair of transparent substrates. The pair of transparent substrates include a driving substrate on which a data line, a scan line, a switching element, a pixel electrode, and the like for applying a driving voltage to liquid crystal are formed and an opposed substrate on which a common electrode, a black matrix, and the like are formed.

The frame-like members 4451 and 4452 are frames having a substantially rectangular shape in a plan view and have rectangular openings 4451A and 4452A corresponding to the image formation area of the liquid crystal panel 441R and grooves 4451B and 4452B for housing the liquid crystal panel cooling pipe 4631R, respectively. The frame-like members 4451 and 4452 are arranged to be opposed to each other with the liquid crystal panel cooling pipe 4631R sandwiched between the frame-like members 4451 and 4452. As the frame-like members 4451 and 4452, a thermal good conductor made of a material with high thermal conductivity is preferably used. For example, other than aluminum (234 W/(m·K)), magnesium (156 W/(m·K)), and alloys of aluminum and magnesium (an aluminum die-cast alloy (about 100 W/(m·K)), an Mg—Al—Zn alloy (about 50 W/(m·K)), etc.), various kinds of metal are applied as the frame-like members 4451 and 4452. A material of the frame-like members 4451 and 4452 is not limited to metal materials and may be other materials (a resin material, etc.) with high thermal conductivity (e.g., equal to or higher than 5 W/(m·K)).

As shown in FIG. 22, the liquid crystal panel fixing plate 4453 is made of a tabular member having a rectangular opening 4453A corresponding to the image formation area of the liquid crystal panel 441R. The liquid crystal panel fixing plate 4453 is fixed to the frame-like member 4452 with the liquid crystal panel 441R sandwiched between the liquid crystal panel fixing plate 4453 and the frame-like member 4452. As shown in FIG. 23B, the liquid crystal panel fixing plate 4453 is arranged in contact with the liquid crystal panel 441R. The liquid crystal panel fixing plate 4453 has a function of bringing the frame-like members 4451 and 4452 and the liquid crystal panel 441R into close contact with each other and, then, thermally connecting the same. The liquid crystal panel fixing plate 4453 also has a function of radiating heat of the liquid crystal panel 441R. A part of the heat of the liquid crystal panel 441R is transmitted to the frame-like members 4451 and 4452 via the liquid crystal panel fixing plate 4453.

The liquid crystal panel cooling pipe 4631R is made of a pipe or a tube having, for example, an annular section and extending along a center axis of the section. As shown in FIG. 22, the liquid crystal panel cooling pipe 4631R is bent according to a shape of the grooves 4451B and 4452B of the frame-like members 4451 and 4452. As the liquid crystal panel cooling pipe 4631R, a thermal good conductor made of a material with high thermal conductivity is preferably used. For example, other than aluminum, copper, stainless steel, and alloys of aluminum, copper, and stainless steel, various kinds of metal are applied as the liquid crystal panel cooling pipe 4631R. A material of the liquid crystal panel cooling pipe 4631R is not limited to metal materials and may be other materials (a resin material, etc.) with high thermal conductivity (e.g., equal to or higher than 5 W(m·K)).

Specifically, as shown in FIGS. 23A and 23B, the liquid crystal panel cooling pipe 4631R is disposed on the outer side of the peripheral edge of the liquid crystal panel 441R around substantially the entire peripheral edge of the liquid crystal panel 441R along the peripheral edge. In respective inner surfaces (mating surfaces or opposed surfaces) of the frame-like members 4451 and 4452, the grooves 4451B and 4452B having a substantially semicircular shape in a section are formed around substantially the entire edges of the openings 4451A and 4452A along the edges. The grooves 4451B and 4452B are in a shape relation of substantially mirror symmetry to each other. The frame-like members 4451 and 4452 are joined to each other in a state in which the liquid crystal panel cooling pipe 4631R is housed in the respective grooves 4451B and 4452B. In this embodiment, the liquid crystal panel cooling pipe 4631R is a circular pipe. An outer diameter of the liquid crystal panel cooling pipe 4631R is practically the same as thickness of the liquid crystal panel 441R.

For joining the frame-like members 4451 and 4452, it is possible to apply various methods such as fastening by screws or the like, bonding, welding, and mechanical joining such as fitting. As a joining method, a method with high thermal conductivity between the liquid crystal panel cooling pipe 4631R and the frame-like members 4451 and 4452 (or the liquid crystal panel 441R) is preferably used.

An inlet section (IN) for the cooling fluid is disposed at one end of the liquid crystal panel cooling pipe 4631R. An outlet section (OUT) is disposed at the other end thereof. The inlet section and the outlet section of the liquid crystal panel cooling pipe 4631R are connected to piping (the pipe sections 469) for cooling fluid circulation, respectively.

The cooling fluid flowing into the liquid crystal panel cooling pipe 4631R from the inlet section (IN) flows around substantially the entire peripheral edge of the liquid crystal panel 441R along the peripheral edge and flows out from the outlet section (OUT). The cooling fluid deprives heat of the liquid crystal panel 441R while the cooling fluid flows through the liquid crystal panel cooling pipe 4631R. In other words, heat of the liquid crystal panel 441R is transmitted to the cooling fluid in the liquid crystal panel cooling pipe 4631R via the frame-like members 4451 and 4452 and carried out to the outside.

In the liquid crystal panel holding frame 445, as shown in FIG. 23B, the liquid crystal panel cooling pipe 4631R is disposed near a light beam incidence surface side of the liquid crystal panel 441R with respect to a thickness direction of the liquid crystal panel 441R. In the liquid crystal panel 441R, in general, heat absorption on an incidence surface side where the black matrix is arranged is large compared with an emission surface side. Therefore, since the liquid crystal panel cooling pipe 4631R is disposed near the incidence surface side where temperature tends to rise, heat of the liquid crystal panel 441R is effectively removed.

Steps are provided on the side surfaces of the liquid crystal panel 441R and an area of the emission surface is set larger than that of the incidence surface. Therefore, since the liquid crystal panel cooling pipe 4631R is disposed near the incidence surface side with the small area, efficiency of arrangement of the components and a reduction in size of the apparatus are realized.

Figure 24A:
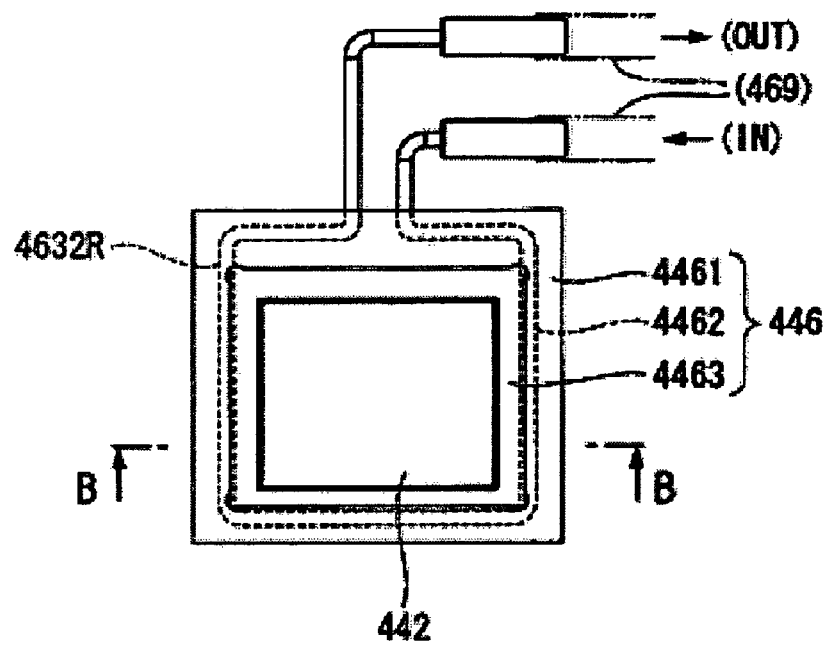
FIG. 24A is an assembled front view of an incidence side sheet polarizer holding frame.
Figure 24B:
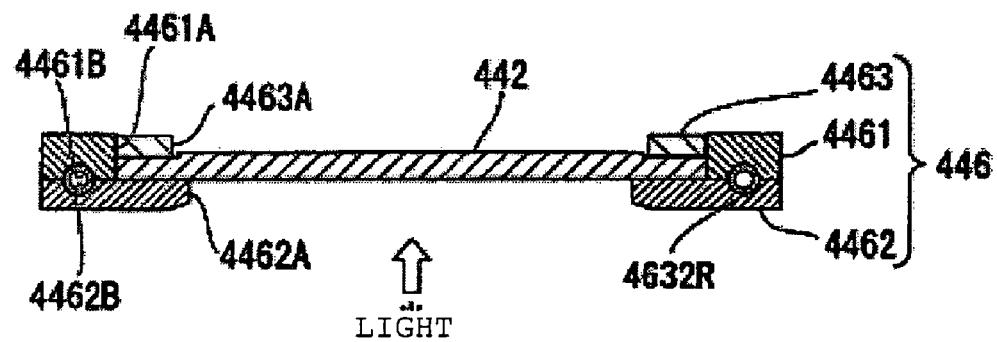
FIG. 24B is a sectional view along line B-B in FIG. 24A.

FIG. 24A is an assembled front view of the incidence side sheet polarizer holding frame 446. FIG. 24B is a sectional view along B-B in FIG. 24A.

The incidence side sheet polarizer holding frame 446 has substantially the same constitution as the liquid crystal panel holding frame 445 (see FIG. 22). As shown in FIGS. 24A and 24B, the incidence side sheet polarizer holding frame 446 includes the pair of frame-like members 4461 and 4462 and a sheet polarizer fixing plate 4463.

The incidence side sheet polarizer 442 has a constitution in which a polarizing film is stuck on a translucent substrate.

The frame-like members 4461 and 4462 are frames having a substantially rectangular shape in a plan view and have rectangular openings 4461A and 4462A corresponding to a light transmission area of the incidence side sheet polarizer 442 and grooves 4461B and 4462B for housing the incidence side sheet polarizer cooling pipe 4632R, respectively. The frame-like members 4461 and 4462 are arranged to be opposed to each other with the incidence side sheet polarizer cooling pipe 4632R sandwiched between the frame-like members 4461 and 4462. As the frame-like members 4461 and 4462, a thermal good conductor made of a material with high thermal conductivity is preferably used. For example, other than aluminum, magnesium, and alloys of aluminum and magnesium, various kinds of metal are applied as the frame-like members 4461 and 4462. A material of the frame-like members 4461 and 4462 is not limited to metal materials and may be other materials (a resin material, etc.) with high thermal conductivity (e.g., equal to or higher than 5 W/(m·K)).

As shown in FIGS. 24A and 24B, the sheet polarizer fixing plate 4463 is made of a tabular member having a rectangular opening 4463A corresponding to the light transmission area of the incidence side sheet polarizer 442. The sheet polarizer fixing plate 4463 is fixed to the frame-like member 4461 with the incidence side sheet polarizer 442 sandwiched between the sheet polarizer fixing plate 4463 and the frame-like member 4461. As shown in FIG. 24B, the sheet polarizer fixing plate 4463 is arranged in contact with the incidence side sheet polarizer 442. The sheet polarizer fixing plate 4463 has a function of bringing the frame-like members 4461 and 4462 and the incidence side sheet polarizer 442 into close contact with each other and, then, thermally connecting the same. The sheet polarizer fixing plate 4463 also has a function of radiating heat of the incidence side sheet polarizer 442. A part of the heat of the incidence side sheet polarizer 442 is transmitted to the frame-like members 4461 and 4462 via the sheet polarizer fixing plate 4463.

The incidence side sheet polarizer cooling pipe 4632R is made of a seamless pipe formed by drawing, reducing, or the like and is bent according to a shape of the grooves 4461B and 4462B of the frame-like members 4461 and 4462. As the incidence side sheet polarizer cooling pipe 4632R, a thermal good conductor made of a material with high thermal conductivity is preferably used. For example, other than aluminum, copper, stainless steel, and alloys of aluminum, copper, and stainless steel, various kinds of metal are applied as the incidence side sheet polarizer cooling pipe 4632R. A material of the incidence side sheet polarizer cooling pipe 4632R is not limited to metal materials and may be other materials (a resin material, etc.) with high thermal conductivity (e.g., equal to or higher than 5 W(m·K)).

Specifically, as shown in FIGS. 24A and 24B, the incidence side sheet polarizer cooling pipe 4632R is disposed on the outer side of the peripheral edge of the incidence side sheet polarizer 442 around substantially the entire peripheral edge of the incidence side sheet polarizer 442 along the peripheral edge. In respective inner surfaces (mating surfaces or opposed surfaces) of the frame-like members 4461 and 4462, the grooves 4461B and 4462B having a substantially semicircular shape in a section are formed around substantially the entire edges of the openings 4461A and 4462A along the edges. The grooves 4461B and 4462B are in a shape relation of substantially mirror symmetry to each other. The frame-like members 4461 and 4462 are joined to each other in a state in which the incidence side sheet polarizer cooling pipe 4632R is housed in the respective grooves 4461B and 4462B. In this embodiment, the incidence side sheet polarizer cooling pipe 4632R is a circular pipe. An outer diameter of the incidence side sheet polarizer cooling pipe 4632R is practically the same as thickness of the incidence side sheet polarizer 442.

For joining the frame-like members 4461 and 4462, it is possible to apply various methods such as fastening by screws or the like, bonding, welding, and mechanical joining such as fitting. As a joining method, a method with high thermal conductivity between the incidence side sheet polarizer cooling pipe 4632R and the frame-like members 4461 and 4462 (or the incidence side sheet polarizer 442) is preferably used.

An inlet section (IN) for the cooling fluid is disposed at one end of the incidence side sheet polarizer cooling pipe 4632R. An outlet section (OUT) is disposed at the other end thereof. The inlet section and the outlet section of the incidence side sheet polarizer cooling pipe 4632R are connected to piping (the pipe sections 469) for cooling fluid circulation, respectively.

The cooling fluid flowing into the incidence side sheet polarizer cooling pipe 4632R from the inlet section (IN) flows around substantially the entire peripheral edge of the incidence side sheet polarizer 442 along the peripheral edge and flows out from the outlet section (OUT). The cooling fluid deprives heat of the incidence side sheet polarizer 442 while the cooling fluid flows through the incidence side sheet polarizer cooling pipe 4632R. In other words, heat of the incidence side sheet polarizer 442 is transmitted to the cooling fluid in the incidence side sheet polarizer cooling pipe 4632R via the frame-like members 4461 and 4462 and carried out to the outside.

FIG. 25A is an assembled front view of the emission side sheet polarizer holding frame 447. FIG. 25B is a sectional view along C-C in FIG. 25A.

The emission side sheet polarizer holding frame 447 has the same constitution as the incidence side sheet polarizer holding frame 446 (see FIG. 24). As shown in FIGS. 25A and 25B, the emission side sheet polarizer holding frame 447 includes the pair of frame-like members 4471 and 4472 and a sheet polarizer fixing plate 4473.

Like the incidence side sheet polarizer 442, the emission side sheet polarizer 443 has a constitution in which a polarizing film is stuck on a translucent substrate.

The frame-like members 4471 and 4472 are frames having a substantially rectangular shape in a plan view and have rectangular openings 4471A and 4472A corresponding to a light transmission area of the emission side sheet polarizer 443 and grooves 4471B and 4472B for housing the emission side sheet polarizer cooling pipe 4633R, respectively. The frame-like members 4471 and 4472 are arranged to be opposed to each other with the emission side sheet polarizer cooling pipe 4633R sandwiched between the frame-like members 4471 and 4472.

As the frame-like members 4471 and 4472, a thermal good conductor made of a material with high thermal conductivity is preferably used. For example, other than aluminum, magnesium, and alloys of aluminum and magnesium, various kinds of metal are applied as the frame-like members 4471 and 4472. A material of the frame-like members 4471 and 4472 is not limited to metal materials and may be other materials (a resin material, etc.) with high thermal conductivity (e.g., equal to or higher than 5 W/(m·K)).

As shown in FIGS. 25A and 25B, the sheet polarizer fixing plate 4473 is made of a tabular member having a rectangular opening 4473A corresponding to the light transmission area of the emission side sheet polarizer 443. The sheet polarizer fixing plate 4473 is fixed to the frame-like member 4471 with the emission side sheet polarizer 443 sandwiched between the sheet polarizer fixing plate 4473 and the frame-like member 4471. As shown in FIG. 25B, the sheet polarizer fixing plate 4473 is arranged in contact with the emission side sheet polarizer 443. The sheet polarizer fixing plate 4473 has a function of bringing the frame-like members 4471 and 4472 and the emission side sheet polarizer 443 into close contact with each other and, then, thermally connecting the same. The sheet polarizer fixing plate 4473 also has a function of radiating heat of the emission side sheet polarizer 443. A part of the heat of the emission side sheet polarizer 443 is transmitted to the frame-like members 4471 and 4472 via the sheet polarizer fixing plate 4473.

The emission side sheet polarizer cooling pipe 4633R is made of a seamless pipe formed by drawing or the like and is bent according to a shape of the grooves 4471B and 4472B of the frame-like members 4471 and 4472. As the emission side sheet polarizer cooling pipe 4633R, a thermal good conductor made of a material with high thermal conductivity is preferably used. For example, other than aluminum, copper, stainless steel, and alloys of aluminum, copper, and stainless steel, various kinds of metal are applied as the emission side sheet polarizer cooling pipe 4633R. A material of the emission side sheet polarizer cooling pipe 4633R is not limited to metal materials and may be other materials (a resin material, etc.) with high thermal conductivity (e.g., equal to or higher than 5 W(m·K)).

Specifically, as shown in FIGS. 24A and 24B, the emission side sheet polarizer cooling pipe 4633R is disposed on the outer side of the peripheral edge of the emission side sheet polarizer 443 around substantially the entire peripheral edge of the emission side sheet polarizer 443 along the peripheral edge. In respective inner surfaces (mating surfaces or opposed surfaces) of the frame-like members 4471 and 4472, the grooves 4471B and 4472B having a substantially semi-circular shape in a section are formed around substantially the entire edges of the openings 4471A and 4472A along the edge. The grooves 4471B and 4472B are in a shape relation of substantially mirror symmetry to each other. The frame-like members 4471 and 4472 are joined to each other in a state in which the emission side sheet polarizer cooling pipe 4633R is housed in the respective grooves 4471B and 4472B. In this embodiment, the emission side sheet polarizer cooling pipe 4633R is a circular pipe. An outer diameter of the emission side sheet polarizer cooling pipe 4633R is practically the same as thickness of the emission side sheet polarizer 443.

For joining the frame-like members 4471 and 4472, it is possible to apply various methods such as fastening by screws or the like, bonding, welding, and mechanical joining such as fitting. As a joining method, a method with high thermal conductivity between the emission side sheet polarizer cooling pipe 4633R and the frame-like members 4471 and 4472 (or the emission side sheet polarizer 443) is preferably used.

An inlet section (IN) for the cooling fluid is disposed at one end of the emission side sheet polarizer cooling pipe 4633R. An outlet section (OUT) is disposed at the other end thereof. The inlet section and the outlet section of the emission side sheet polarizer cooling pipe 4633R are connected to piping (the pipe sections 469) for cooling fluid circulation, respectively.

The cooling fluid flowing into the emission side sheet polarizer cooling pipe 4633R from the inlet section (IN) flows around substantially the entire peripheral edge of the emission side sheet polarizer 443 along the peripheral edge and flows out from the outlet section (OUT). The cooling fluid deprives heat of the emission side sheet polarizer 443 while the cooling fluid flows through the emission side sheet polarizer cooling pipe 4633R. In other words, heat of the emission side sheet polarizer 443 is transmitted to the cooling fluid in the emission side sheet polarizer cooling pipe 4633R via the frame-like members 4471 and 4472 and carried out to the outside.

As described above, in this embodiment, for red light, the element cooling pipes 4631R, 4632R, and 4633R are disposed inside the holding frames 445, 446, and 447 for the respective elements, that is, the liquid crystal panel 441R, the incidence side sheet polarizers 442, and the emission side sheet polarizers 443. Heat of the respective elements 441R, 442, and 443 is appropriately removed by the cooling fluid flowing through the element cooling pipes 4631R, 4632R, and 4633R. The respective elements 441R, 442, and 443 and the element cooling pipes 4631R, 4632R, and 4633R are thermally connected via the respective holding frames 445, 446, and 447. Heat exchange is performed between the respective elements 441R, 442, and 443 and the cooling fluid in the element cooling pipes 4631R, 4632R, and 4633R. Consequently, the heat of the respective elements 441R, 442, and 443 is transmitted to the cooling fluid in the element cooling pipes 4631R, 4632R, and 4633R-via the holding frames 445, 446, and 447. Since the heat of the respective elements 441R, 442, and 443 moves to the cooling fluid, the respective elements 441R, 442, and 443 are cooled.

In this embodiment, the respective element cooling pipes 4631R, 4632R, and 4633R are disposed around substantially the entire peripheral edges of the respective elements 441R, 442, and 443 along the peripheral edges. Thus, a heat transmission area is enlarged and the respective elements are effectively cooled.

Moreover, the flow paths (the element cooling pipes 4631R, 4632R, and 4633R) of the cooling fluid are disposed along the peripheral edges of the respective elements 441R, 442, and 443. Thus, a light beam for image formation does not pass through the cooling fluid. Consequently, images of bubbles, dust, and the like in the cooling fluid are prevented from being included in an optical image formed by the liquid crystal panel 441R and fluctuation of the optical image due to a temperature distribution of the cooling fluid is prevented from being caused.

In this embodiment the flow paths of the cooling fluid in the peripheral edges of the respective elements 441R, 442, and 443 are formed by the pipes (the element cooling pipes 4631R, 4632R, and 4633R). Thus, only a relatively small joining section for forming a path for the cooling fluid is required. Since the number or an area of joining sections is small, a constitution of the optical device is simplified and leakage of the cooling fluid is prevented.

As described above, according to this embodiment, it is possible to effectively control a temperature rise of the respective elements 441R, 442, and 443 while preventing deficiency caused by using the cooling fluid.

In the structure in which the element cooling pipes 4631R, 4632R, and 4633R are disposed inside the element holding frames 445, 446, and 447, the element holding frames 445, 446, and 447 serves as both holding means and cooling means for the respective elements 441R, 442, and 443. As a result, it is easy to reduce a size of the optical device. The invention is preferably applicable to a small optical element.

For example, in this embodiment, the element cooling pipes 4631R, 4632R, and 4633R having an outer diameter practically the same as thickness of the respective elements 441R, 442, and 443 are disposed on the outer sides of the peripheral edges of the elements. Thus, expansion of the optical device in a thickness direction caused by providing the cooling fluid paths is prevented.

The panel constitution for red light and the cooling structure for the panel in the optical device 44 (see FIG. 18) have been explained as the representative ones. The panel constitution and the cooling structure are the same for green light and blue light. Respective elements (liquid crystal panels, incidence side sheet polarizers, and emission side sheet polarizers) are separately held in holding frames and element cooling pipes are disposed inside the holding frames.

In this embodiment, the nine optical elements in total including the three liquid crystal panels 441R, 441G, and 441B, the three incidence side sheet polarizers 442, and the three emission side sheet polarizers 443 are separately cooled using the cooling fluid. Since the elements are separately cooled, occurrence of deficiency due to a temperature rise of the respective elements is surely prevented.

Piping System

Figure 26:
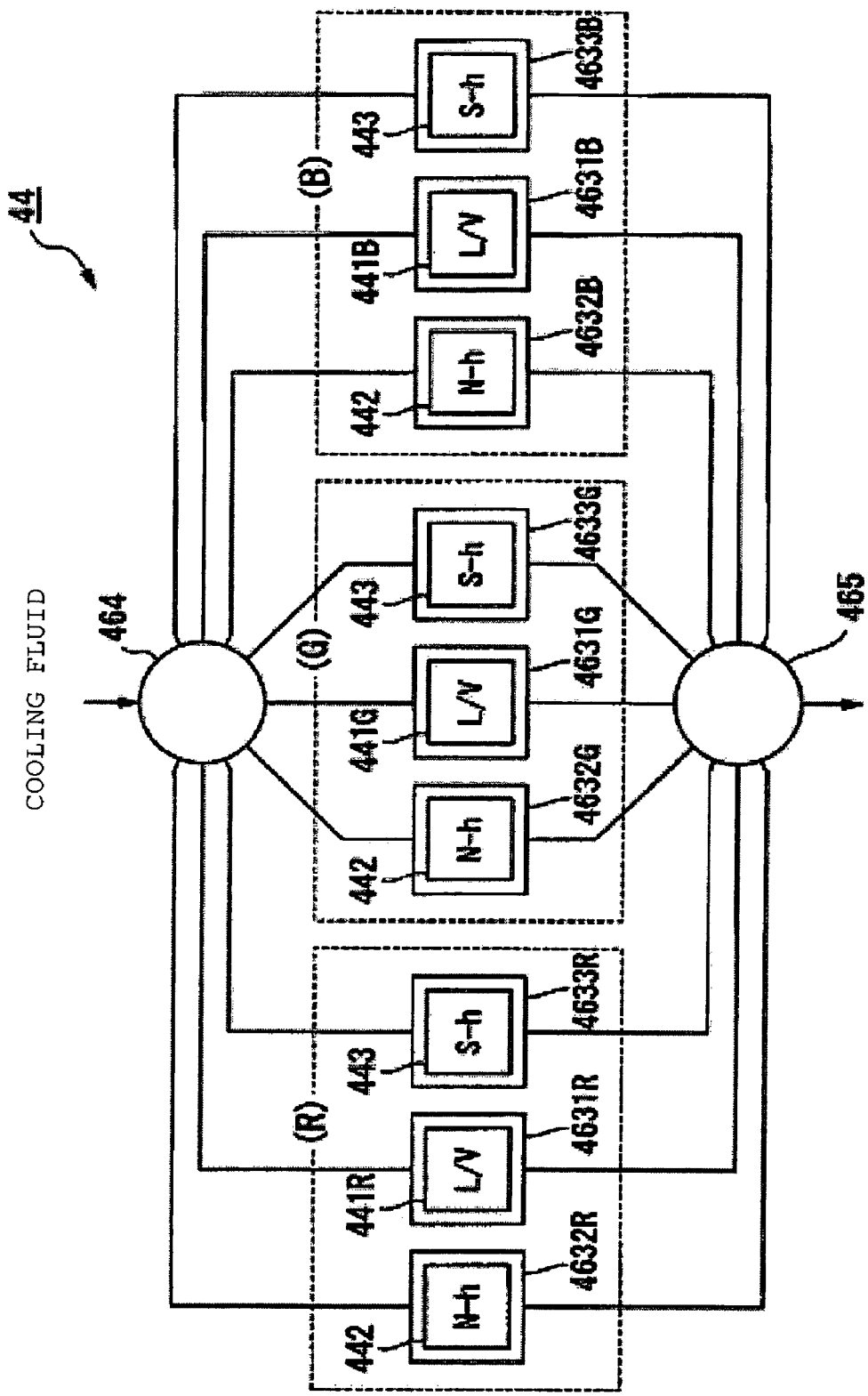
FIG. 26 is a piping system diagram showing a flow of a cooling fluid in the optical device.

FIG. 26 is a piping system diagram showing a flow of the cooling fluid in the optical device 44 described above.

As shown in FIG. 26, in this embodiment, paths of the cooling fluid are provided in parallel to the nine optical elements in total including the three liquid crystal panels 441R, 441G, and 441B, the three incidence side sheet polarizers 442, and the three emission side sheet polarizers 443 in the optical device 44.

Specifically, the three element cooling pipes including the liquid crystal panel cooling pipe 4631R, the incidence side sheet polarizer cooling pipe 4632R, and the emission side sheet polarizer cooling pipe 4633R for red light are connected to the branching tank 464 at one ends thereof and connected to the merging tank 465 at the other ends thereof, respectively. Similarly, the three element cooling pipes 4631G, 4632G, and 4633G for green light and the three element cooling pipes 4631B, 4632B, and 4633B for blue light are also connected to the branching tank 464 at one ends thereof and connected to the merging tank 465 at the other ends thereof, respectively. As a result, the nine element cooling pipes are arranged in parallel to one another on the paths of the cooling fluid between the branching tank 464 and the merging tank 465.

The cooling fluid is branched to the nine paths in total, three for each of the colors, in the branching tank 464 and the branched cooling fluids flow in parallel to one another in the nine element cooling pipes (4631R, 4632R, 4633R, 4631G, 4632G, 4633G, 4631B, 4632B, and 4633B). Since the nine element cooling pipes are arranged in parallel to one another on the paths of the cooling fluid, cooling fluids of substantially the same temperatures flow into the respective element cooling pipes. Since the cooling fluids flow through the respective element cooling pipes, the respective elements are cooled and temperatures of the cooling fluids flowing through the respective element cooling pipes rise. After this heat exchange, the cooling fluids merge in the merging tank 465 and are cooled by heat radiation in the radiator 466 (see FIG. 17) explained above. The cooling fluid with lowered temperature is supplied to the branching tank 464 again.

In this embodiment, the nine element cooling pipes corresponding to the nine optical elements are arranged in parallel to one another on the paths of the cooling fluid. Thus, the paths of the cooling fluid leading from the branching tank 464 to the merging tank 465 are relatively short and a flow path resistance due to a pressure loss in the paths is small. Therefore, a flow rate of the cooling fluid is easily secured even if the respective element cooling pipes have small diameters. In addition, since the cooling fluid with relatively low temperature is supplied to each of the elements, the respective elements are effectively cooled.

The element cooling pipe does not have to be disposed for an element with less heat generation among the nine optical elements. For example, when the incidence side sheet polarizers 442 or the emission side sheet polarizers 443 take a form with less absorption of light beams like an inorganic sheet polarizer, cooling pipes do not have to be provided for the incidence side sheet polarizers 442 or the emission side sheet polarizers 443.

At least a part of plural element cooling pipes may be arranged in series instead of arranging all the element cooling pipes in parallel to one another on the paths of the cooling fluid. In this case, it is advisable to decide paths for the respective elements according to amounts of heat generation of the elements.

Figure 27:
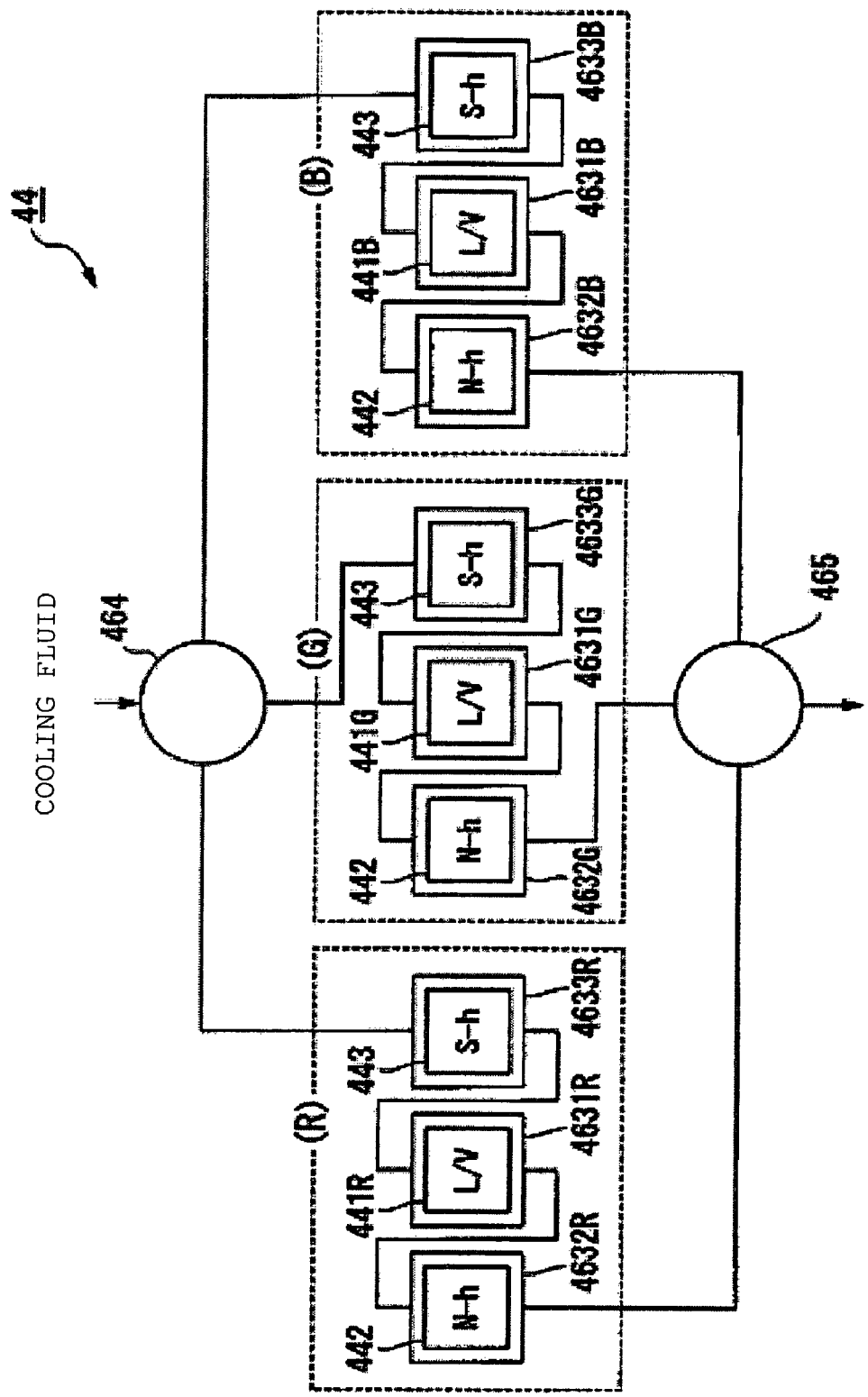
FIG. 27 is a diagram showing a modification of the piping system.

FIG. 27 shows a modification of the piping system. Note that components same as those in FIG. 26 are denoted by the identical reference numerals and signs.

In the example in FIG. 27, the element cooling pipes (4631R, 4632R, 4633R, 4631G, 4632G, 4633G, 4631B, 4632B, and 4633B) are disposed for the nine optical elements in total including the three liquid crystal panels 441R, 441G, 441B, the three incidence side sheet polarizers 442, and the three emission side sheet polarizers 443 in the optical device 44. Paths of cooling fluid are provided in series for each of the colors.

Specifically, for red light, the outlet section of the branching tank 464 and the inlet section of the emission side sheet polarizer cooling pipe 4633R are connected, the outlet section of the emission side sheet polarizer cooling pipe 4633R and the inlet section of the liquid crystal panel cooling pipe 4631R are connected, the outlet section of the liquid crystal panel cooling pipe 4631R and the inlet section of the incidence side sheet polarizer cooling pipe 4632R are connected, and the outlet section of the incidence side sheet polarizer cooling pipe 4632R and the inlet section of the merging tank 465 are connected. In other words, from the branching tank 464 to the merging tank 465, the emission side sheet polarizer cooling pipe 4633R, the liquid crystal panel cooling pipe 4631R, and the incidence side sheet polarizer cooling pipe 4632R are arranged in series in this order. Similarly, for green light, from the branching tank 464 to the merging tank 465, the emission side sheet polarizer cooling pipe 4633G, the liquid crystal panel cooling pipe 4631G, and the incidence side sheet polarizer cooling pipe 4632G are arranged in series in this order. Moreover, for blue light, from the branching tank 464 to the merging tank 465, the emission side sheet polarizer cooling pipe 4633B, the liquid crystal panel cooling pipe 4631B, and the incidence side sheet polarizer cooling pipe 4632B are arranged in series in this order.

The cooling fluid is branched into three paths in the branching tank 464. For each of the colors, first, the branched cooling fluids flow through the emission side sheet polarizer cooling pipes 4633R, 4633G, and 4633B, then, flow through the liquid crystal panel cooling pipes 4631R, 4631G, and 4631B, and, lastly, flow through the incidence side sheet polarizer cooling pipes 4632R, 4632G, and 4632B. Since the cooling fluids flow through the respective element cooling pipes along the peripheral edges of the respective elements, the respective elements are cooled and temperatures of the cooling fluids flowing through the respective element cooling pipes rise. In this example, since the three element cooling pipes are arranged in series for each of the colors, temperatures at the time of inflow (entrance temperatures) of the cooling fluids are the lowest in the emission side sheet polarizer cooling pipes 4633R, 4633G, and 4633B on an upstream side, second lowest in the liquid crystal panel cooling pipes 4631R, 4631G, and 4631B, and relatively high in the incidence side sheet polarizer cooling pipes 4632R, 4632G, and 4632B on a downstream side. Thereafter, the cooling fluids merge in the merging tank 465 and are cooled by heat radiation in the radiator 466 (see FIG. 17) explained above. The cooling fluid with lowered temperature is supplied to the branching tank 464 again.

In the liquid crystal panels 441R, 441G, and 441B, in addition to light absorption in liquid crystal layers, light beams are partially absorbed in data lines and scan lines formed on driving substrates, black matrixes formed on opposed substrates, and the like. In the incidence side sheet polarizers 442, incident light beams are light beams converted into substantially one kind of polarized light by the polarization conversion element 414 (see FIG. 15) on the upstream side. Since most of the light beams are transmitted, absorption of the light beams is relatively small. In the emission side sheet polarizers 443, incident light beams are light beams with polarizing directions modulated on the basis of image information. Usually, an absorption amount of the light beams is larger than that in the incidence side sheet polarizer 442.

An amount of heat generation in the optical device 44 tends to increase in an order of incidence side sheet polarizers, liquid crystal panels, and emission side sheet polarizers (incidence side sheet polarizers<liquid crystal panels<emission side sheet polarizers).

In the example in FIG. 27, since the three element cooling pipes are arranged in series on the paths of the cooling fluid for each of the colors, a piping space is reduced compared with a constitution in which all the nine element cooling pipes are arranged in parallel to one another.

Since the cooling fluid is supplied to the emission side sheet polarizers 443 with a relatively high amount of heat generation first, the emission side sheet polarizers 443 are surely cooled.

In the example described above, the element cooling pipes are arranged in series from the upstream side in order from one with a highest amount of heat generation. However, the arrangement of the element cooling pipes is not limited to this. The element cooling pipes may be arranged in series from the upstream side in an order from one with a lowest amount heat generation or in other orders. An order of the arrangement is decided according to a difference of amounts of heat generation among plural elements, cooling abilities of the element cooling pipes, and the like.

Only a part of plural element cooling pipes may be arranged in series as described below rather than arranging all the plural element cooling pipes in series for each of the colors.

FIG. 28 shows another modification of the piping system. Note that components same as those in FIG. 26 are denoted by the identical reference numerals and signs.

In the example in FIG. 28, the element cooling pipes (4631R, 4632R, 4633R, 4631G, 4632G, 4633G, 4631B, 4632B, and 4633B) are disposed for the nine optical elements in total including the three liquid crystal panels 441R, 441G, 441B, the three incidence side sheet polarizers 442, and the three emission side sheet polarizers 443 in the optical device 44. Paths of cooling fluid are provided partially in series for each of the colors.

Specifically, for red light, from the branching tank 464 to the merging tank 465, the liquid crystal panel cooling pipe 4631R and the incidence side sheet polarizer cooling pipe 4632R are arranged in series in this order and the emission side sheet polarizer cooling pipe 4633R are arranged in parallel to the liquid crystal panel cooling pipe 4631R and the incidence side sheet polarizer cooling pipe 4632R. The outlet section of the branching tank 464 and the inlet section of the liquid crystal panel cooling pipe 4631R are connected, the outlet section of the liquid crystal panel cooling pipe 4631R and the inlet section of the incidence side sheet polarizer cooling pipe 4632R are connected, and the outlet section of the incidence side sheet polarizer cooling pipe 4632R and the inlet section of the merging tank 465 are connected. The outlet section of the branching tank 464 and the inlet section of the emission side sheet polarizer cooling pipe 4633R are connected and the outlet section of the emission side sheet polarizer cooling pipe 4633R and the inlet section of the merging tank 465 are connected. Similarly, for green light, from the branching tank 464 to the merging tank 465, the liquid crystal panel cooling pipe 4631G and the incidence side sheet polarizer cooling pipe 4632G are arranged in series in this order and the emission side sheet polarizer cooling pipe 4633G is arranged in parallel to the liquid crystal panel cooling pipe 4631G and the incidence side sheet polarizer cooling pipe 4632G. Moreover, for blue light, the liquid crystal panel cooling pipe 4631B and the incidence side sheet polarizer cooling pipe 4632B are arranged in series in this order and the emission side sheet polarizer cooling pipe 4633B is arranged in parallel to the liquid crystal panel cooling pipe 4631B and the incidence side sheet polarizer cooling pipe 4632B.

The cooling fluid is branched into six paths in total, two for each of the colors, in the branching tank 464. For each of the colors, first, the branched cooling fluids flow into the liquid crystal panel cooling pipes 4631R, 4631G, and 4631B and the emission side sheet polarizer cooling pipes 4633R, 4633G, and 4633B. The cooling fluids that have flown through the liquid crystal panel cooling pipes 4631R, 4631G, and 4631B then flow through the incidence side sheet polarizer cooling pipe 4632R, 4632G, and 4632B. Thereafter, the cooling fluids flow to the merging tank 465. On the other hand, the cooling fluids that have flown through the emission side sheet polarizer cooling pipes 4633R, 4633G, and 4633B directly flow to the merging tank 465 from the emission side sheet polarizer cooling pipes 4633R, 4633G, and 4633B for each of the colors. Since the cooling fluids flow through the respective element cooling pipes along the peripheral edges of the respective elements, the respective elements are cooled and temperatures of the cooling fluids flowing through the respective element cooling pipes rise. In this example, temperatures at the time of inflow (entrance temperatures) of the cooling fluids are relatively low in the liquid crystal panel cooling pipes 4631R, 4631G, and 4631B and the emission side sheet polarizer cooling pipes 4633R, 4633G, and 4633B on an upstream side and relatively high in the incidence side sheet polarizer cooling pipes 4632R, 4632G, and 4632B. Since an amount of heat generation of the emission side sheet polarizers 443 is the highest compared with the other elements, temperatures at the time of outflow (exit temperatures) of the cooling fluids in the emission side sheet polarizer cooling pipes 4633R, 4633G, and 4633B are relatively high. Compared with the exit temperatures, exit temperatures of the liquid crystal panel cooling pipes 4631R, 4631G, and 4631B are relatively low. Therefore, in the example in FIG. 28, entrance temperatures of the incidence side sheet polarizer cooling pipes 4632R, 4632G, and 4632B are low compared with those in the example in FIG. 27. The cooling fluids that have flown in the peripheral edges of the respective elements then merge in the merging tank 465 and are cooled by heat radiation in the radiator 466 (see FIG. 17) explained above. The cooling fluid with lowered temperature is supplied to the branching tank 464 again.

In the example in FIG. 28, since two element cooling pipes are arranged in series for each of the colors and another element cooling pipe is arranged in parallel to the two element cooling pipes, a piping space is reduced compared with a constitution in which all the nine element cooling pipes are arranged in parallel to one another.

The cooling paths are provided for the liquid crystal panel 441R, 441G, and 441B and the incidence side sheet polarizers 442 in parallel to the cooling paths for the emission side sheet polarizers 443 with a high amount of heat generation. Thus, heat of the emission side sheet polarizers 443 is prevented from affecting the other elements. The liquid crystal panels 441R, 441G, and 441B and the incidence side sheet polarizers 442 are effectively cooled.

In the examples in FIGS. 26, 27, and 28, the cooling structures for three colors of red (R), green (G), and blue (B) are the same. However, the cooling structures may be different for each of the colors. For example, it is also possible that the constitution in FIG. 27 or 28 is adopted for red light and blue light and the constitution in FIG. 26 or 28 is adopted for green light. Other combinations may be adopted.

Singe green light generally has relatively high optical intensity, temperature of an optical element for green light tends to rise. Therefore, a cooling structure with a high cooling effect is adopted for green light and a cooling structure with a simple constitution is adopted for red light and blue light. Consequently, a reduction in a piping space and efficiency of element cooling are realized.

In the examples in FIGS. 26, 27, and 28, the branching tank 464 branches a path of cooling fluid into at least three in association with three colors of red, green, and blue. However, branching of a path of cooling fluid is not limited to this. For example, the branching tank 464 may branch a path of cooling fluid into a system for red light and blue light and a system for green light. In this case, for example, cooling structures for red light and blue light are arranged in series and a cooling structure for green light is arranged in parallel to the cooling structures for red light and blue light. Consequently, as described above, it is possible to realize a reduction in a piping space and efficiency of element cooling.

In the embodiment described above, the example of the projector using three liquid crystal panels is explained. However, it is also possible to apply the invention to a projector using only one liquid crystal panel, a projector using only two liquid crystal panels, and a projector using four or more liquid crystal panels.

The liquid crystal panel is not limited to a transmission liquid crystal panel and may be a reflection liquid crystal panel.

The optical modulator is not limited to a liquid crystal panel and may be an optical modulator other than liquid crystal such as a device using a micro-mirror. In this case, sheet polarizers on a light beam incidence side and a light beam emission side do not have to be provided.

It is also possible to apply the invention to a projector of a front type that performs projection from a direction for observing a screen and a projector of a rear type that performs projection from a direction opposite to a direction for observing a screen.

The preferred embodiment of the invention has been explained with reference to the accompanying drawings. It goes without saying that the invention is not limited to such an embodiment. It is obvious that those skilled in the art can arrive at various modifications and alterations within the scope of the technical idea described in claims. It is understood that the modifications and alterations naturally belong to the technical scope of the invention.

The entire disclosure of Japanese Patent Application No.2005-055629, filed Mar. 1, 2005 is expressly incorporated by reference herein.

What is claimed is:

1. A method of manufacturing a cooling unit that includes a cooling plate in which a cooling fluid flows, the cooling plate having a pair of tabular members arranged to be opposed to each other, and a cooling pipe, through which the cooling fluid flows, sandwiched between the tabular members, the manufacturing method comprising:

forming grooves for housing the cooling pipe in respective opposed surfaces of the pair of tabular members, the grooves in the opposed surfaces being mirror images of each other the grooves being larger than a diameter of the cooling pipe and a gap being between the grooves and the cooling pipe;

forming projections projecting to inner sides of the grooves by applying an external force or joining a predetermined member to the respective opposed surfaces of the pair of tabular members; and combining each of the pair of tabular members and the cooling pipe by housing the cooling pipe in the grooves and expanding the diameter of the cooling pipe.

2. The manufacturing method according to claim 1, wherein the grooves are formed using a casting method or a forging method.

3. The manufacturing method according to claim 1, wherein the projections are formed using a forging method.

4. The manufacturing method according to claim 3, wherein, in forming projections, a predetermined die is pressed against the respective opposed surfaces of the pair of tabular members to plastically deform portions adjacent to the grooves.

5. The manufacturing method according to claim 3, wherein
in forming grooves, banks adjacent to the grooves are formed on the respective opposed surfaces of the pair of tabular members in addition to the grooves, and
in forming projections, a predetermined die is pressed against the banks to plastically deform the portions adjacent to the grooves.

6. The manufacturing method according to claim 3, wherein
in forming grooves, banks adjacent to the grooves and recesses arranged on outer sides of the banks with respect to the grooves are formed on the respective opposed surfaces of the pair of tabular members in addition to the grooves, and
in forming projections, a predetermined die is pressed against the banks to plastically deform portions adjacent to the grooves.

7. The manufacturing method according to claim 1, wherein, in forming projections, another member, in which openings corresponding to the grooves and projections projecting to inner sides of the openings are formed, is joined to the respective opposed surfaces of the pair of tabular members.

8. The manufacturing method according to claim 1, wherein, in forming projections, a separate member, in which openings corresponding to the grooves are formed, is joined to the respective opposed surfaces of the pair of tabular members and a predetermined die is pressed against one surface of the separate member to plastically deform portions adjacent to the openings.

9. The manufacturing method according to claim 1, further comprising filling a thermally-conductive material in a gap between the grooves and the cooling pipe.

10. The manufacturing method according to claim 9, wherein the thermally-conductive material contains at least one of a resin material mixed with a metal material, a resin material mixed with a carbon material, and hot-melt adhesive.

11. The manufacturing method according to claim 9, wherein the thermally-conductive material has elasticity within an operating temperature range of the cooling plate.

12. The manufacturing method according to claim 9, wherein supplementary grooves, which communicate with the gap between the grooves and the cooling pipe and in which the thermally-conductive material is stored temporarily, are formed at least one of the pair of tabular members.

13. The manufacturing method according to claim 12, wherein, in forming grooves, the supplementary grooves are formed in inner surfaces of the grooves and/or at least one opposed surface of the pair of tabular members.

14. The manufacturing method according to claim 9, wherein, in filling, the thermally-conductive material is softened and fluidized to fill the thermally-conductive material.

15. The manufacturing method according to claim 14, wherein the thermally-conductive material is softened by heat of the cooling pipe in expanding diameter.

16. The manufacturing method according to claim 1, wherein each of the grooves have a substantially semicircular shape.

* * * * *

UNITED STATES PATENT AND TRADEMARK OFFICE
CERTIFICATE OF CORRECTION

| | | |
|---|---|---|
| PATENT NO. | : 7,661,192 B2 | Page 1 of 1 |
| APPLICATION NO. | : 11/335604 | |
| DATED | : February 16, 2010 | |
| INVENTOR(S) | : Fujimori et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 898 days.

Signed and Sealed this

Twenty-eighth Day of December, 2010

David J. Kappos
*Director of the United States Patent and Trademark Office*